(12) United States Patent
Hamanaka

(10) Patent No.: US 11,034,190 B2
(45) Date of Patent: Jun. 15, 2021

(54) PNEUMATIC TIRE

(71) Applicant: The Yokohama Rubber Co., LTD., Tokyo (JP)

(72) Inventor: Hideki Hamanaka, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/619,919

(22) PCT Filed: Apr. 10, 2018

(86) PCT No.: PCT/JP2018/015099
§ 371 (c)(1),
(2) Date: Dec. 5, 2019

(87) PCT Pub. No.: WO2018/225371
PCT Pub. Date: Dec. 13, 2018

(65) Prior Publication Data
US 2020/0376895 A1   Dec. 3, 2020

(30) Foreign Application Priority Data

Jun. 6, 2017  (JP) .............................. JP2017-111854
Jun. 6, 2017  (JP) .............................. JP2017-111855

(51) Int. Cl.
*B60C 11/12*   (2006.01)
*B60C 11/03*   (2006.01)
*B60C 11/04*   (2006.01)

(52) U.S. Cl.
CPC .......... *B60C 11/0302* (2013.01); *B60C 11/04* (2013.01); *B60C 11/1204* (2013.01);
(Continued)

(58) Field of Classification Search
CPC ............. B60C 11/1263; B60C 11/1281; B60C 11/0302; B60C 11/04; B60C 11/1236
See application file for complete search history.

(56) References Cited

U.S. PATENT DOCUMENTS 6,196,288 B1 *   3/2001   Radulescu .......... B60C 11/0309
                                                   152/209.17
7,836,926 B2 *   11/2010  Suzuki .................... B60C 11/12
                                                   152/209.18
(Continued)

FOREIGN PATENT DOCUMENTS

JP    2008-296643    12/2008
JP    2010-202109     9/2010
(Continued)

OTHER PUBLICATIONS

International Search Report for International Application No. PCT/JP2018/015099 dated Jun. 12, 2018, 4 pages, Japan.

*Primary Examiner* — Robert C Dye
(74) *Attorney, Agent, or Firm* — Thorpe North & Western

(57) ABSTRACT

A pneumatic tire includes: a rib defined by a circumferential main groove; circumferential sipes formed in the rib at intervals in the circumferential direction; rib edge sipes formed in the rib aligning in the circumferential direction, each of the rib edge sipes terminating in the rib opening to the circumferential main groove; and first and second narrow grooves extending in the circumferential direction, each of the first and second narrow grooves having a groove depth shallower than depths of the circumferential sipes and the rib edge sipes, the first narrow grooves having ends connected to one of the circumferential sipes adjacent to each other in the circumferential direction and the second narrow grooves each including an inner connecting portion connected to one of the first narrow shallow grooves and including an outer connecting portion connected to one of the rib edge sipes.

19 Claims, 17 Drawing Sheets

(52) U.S. Cl.
CPC ........ *B60C 11/124* (2013.01); *B60C 11/1263* (2013.01); *B60C 11/1281* (2013.01); *B60C 2011/1213* (2013.01); *B60C 2011/1245* (2013.01)

(56) References Cited

U.S. PATENT DOCUMENTS

2016/0347125 A1* 12/2016 Itou ................... B60C 11/1315
2016/0368327 A1   12/2016 Fujioka

FOREIGN PATENT DOCUMENTS

| JP | 2013-121760 | 6/2013 |
| JP | 2014-218101 | 11/2014 |
| JP | 2016-020111 | 2/2016 |
| JP | 2017-007476 | 1/2017 |
| WO | WO 2015/118786 | 8/2015 |

* cited by examiner

|  | CONVENTIONAL EXAMPLE 1 | COMPARATIVE EXAMPLE 1 | EXAMPLE 1-1 | EXAMPLE 1-2 | EXAMPLE 1-3 | EXAMPLE 1-4 | EXAMPLE 1-5 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | NO | YES | YES | YES | YES | YES | YES |
| SECOND NARROW SHALLOW GROOVE | NO | NO | YES | YES | YES | YES | YES |
| MAXIMUM GROOVE DEPTH $D_{N1}$ OF FIRST NARROW SHALLOW GROOVE (mm) | - | 5.0 | 5.0 | 0.3 | 5.0 | 4.0 | 1.5 |
| MAXIMUM GROOVE DEPTH $D_{N2}$ OF SECOND NARROW SHALLOW GROOVE (mm) | - | - | 5.0 | 5.0 | 0.3 | 5.0 | 5.0 |
| MAXIMUM DEPTH $D_{SC}$ OF CIRCUMFERENTIAL SIPE /MAXIMUM DEPTH D OF CIRCUMFERENTIAL MAIN GROOVE | 0.45 | 0.45 | 0.45 | 0.45 | 0.45 | 0.45 | 0.45 |
| MAXIMUM DEPTH $D_{SE}$ OF RIB EDGE SIPE /MAXIMUM DEPTH D OF CIRCUMFERENTIAL MAIN GROOVE | 0.55 | 0.55 | 0.55 | 0.55 | 0.55 | 0.55 | 0.55 |
| ANGLE α OF SECOND NARROW SHALLOW GROOVE IS ACUTE | - | - | NO | NO | NO | NO | NO |
| ANGLE β OF RIB EDGE SIPE IS ACUTE | NO | NO | NO | NO | NO | NO | NO |
| LENGTH $L_{N1}$ OF FIRST NARROW SHALLOW GROOVE /LENGTH $L_{SC}$ OF CIRCUMFERENTIAL SIPE | - | 0.6 | 0.6 | 0.6 | 0.6 | 0.6 | 0.6 |
| UNEVEN WEAR RESISTANCE | 100 | 103 | 110 | 110 | 110 | 112 | 115 |

FIG. 11A

|  | EXAMPLE 1-6 | EXAMPLE 1-7 | EXAMPLE 1-8 | EXAMPLE 1-9 | EXAMPLE 1-10 | EXAMPLE 1-11 | EXAMPLE 1-12 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | YES | YES | YES | YES | YES | YES | YES |
| SECOND NARROW SHALLOW GROOVE | YES | YES | YES | YES | YES | YES | YES |
| MAXIMUM GROOVE DEPTH $D_{N1}$ OF FIRST NARROW SHALLOW GROOVE (mm) | 1.5 | 5.0 | 5.0 | 0.3 | 1.5 | 1.5 | 1.5 |
| MAXIMUM GROOVE DEPTH $D_{N2}$ OF SECOND NARROW SHALLOW GROOVE (mm) | 0.3 | 4.0 | 1.5 | 1.5 | 4.0 | 1.5 | 1.5 |
| MAXIMUM DEPTH $D_{SC}$ OF CIRCUMFERENTIAL SIPE /MAXIMUM DEPTH D OF CIRCUMFERENTIAL MAIN GROOVE | 0.45 | 0.45 | 0.45 | 0.45 | 0.45 | 0.45 | 0.85 |
| MAXIMUM DEPTH $D_{SE}$ OF RIB EDGE SIPE /MAXIMUM DEPTH D OF CIRCUMFERENTIAL MAIN GROOVE | 0.55 | 0.55 | 0.55 | 0.55 | 0.55 | 0.55 | 0.55 |
| ANGLE α OF SECOND NARROW SHALLOW GROOVE IS ACUTE | NO | NO | NO | NO | NO | NO | NO |
| ANGLE β OF RIB EDGE SIPE IS ACUTE | NO | NO | NO | NO | NO | NO | NO |
| LENGTH $L_{N1}$ OF FIRST NARROW SHALLOW GROOVE /LENGTH $L_{SC}$ OF CIRCUMFERENTIAL SIPE | 0.6 | 0.6 | 0.6 | 0.6 | 0.6 | 0.6 | 0.6 |
| UNEVEN WEAR RESISTANCE | 115 | 116 | 117 | 117 | 117 | 120 | 120 |

FIG. 11B

|  | EXAMPLE 1-13 | EXAMPLE 1-14 | EXAMPLE 1-15 | EXAMPLE 1-16 | EXAMPLE 1-17 | EXAMPLE 1-18 | EXAMPLE 1-19 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | YES | YES | YES | YES | YES | YES | YES |
| SECOND NARROW SHALLOW GROOVE | YES | YES | YES | YES | YES | YES | YES |
| MAXIMUM GROOVE DEPTH $D_{N1}$ OF FIRST NARROW SHALLOW GROOVE (mm) | 1.5 | 1.5 | 1.5 | 1.5 | 1.5 | 1.5 | 1.5 |
| MAXIMUM GROOVE DEPTH $D_{N2}$ OF SECOND NARROW SHALLOW GROOVE (mm) | 1.5 | 1.5 | 1.5 | 1.5 | 1.5 | 1.5 | 1.5 |
| MAXIMUM DEPTH $D_{SC}$ OF CIRCUMFERENTIAL SIPE /MAXIMUM DEPTH D OF CIRCUMFERENTIAL MAIN GROOVE | 0.65 | 0.65 | 0.65 | 0.65 | 0.65 | 0.65 | 0.65 |
| MAXIMUM DEPTH $D_{SE}$ OF RIB EDGE SIPE /MAXIMUM DEPTH D OF CIRCUMFERENTIAL MAIN GROOVE | 0.55 | 0.95 | 0.75 | 0.75 | 0.75 | 0.75 | 0.75 |
| ANGLE α OF SECOND NARROW SHALLOW GROOVE IS ACUTE | NO | NO | NO | YES | YES | YES | YES |
| ANGLE β OF RIB EDGE SIPE IS ACUTE | NO | NO | NO | NO | YES | YES | YES |
| LENGTH $L_{N1}$ OF FIRST NARROW SHALLOW GROOVE /LENGTH $L_{SC}$ OF CIRCUMFERENTIAL SIPE | 0.6 | 0.6 | 0.6 | 0.6 | 0.6 | 0.3 | 0.9 |
| UNEVEN WEAR RESISTANCE | 122 | 122 | 125 | 130 | 135 | 132 | 132 |

FIG. 11C

| | CONVENTIONAL EXAMPLE 2 | COMPARATIVE EXAMPLE 2 | EXAMPLE 2-1 | EXAMPLE 2-2 | EXAMPLE 2-3 | EXAMPLE 2-4 | EXAMPLE 2-5 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | NO | YES | YES | YES | YES | YES | YES |
| LEFT AND RIGHT SECOND NARROW SHALLOW GROOVES | NO | NO | YES | YES | YES | YES | YES |
| OFFSET AMOUNT $L_{N2}$ OF SECOND NARROW SHALLOW GROOVE /DISTANCE $L_{SE}$ | - | - | 0.4 | 2.1 | 1 | 1 | 1 |
| OFFSET AMOUNT $L_{N2}$ OF SECOND NARROW SHALLOW GROOVE /LENGTH $L_{SC}$ OF CIRCUMFERENTIAL SIPE | - | - | 0.3 | 0.3 | 0.08 | 0.7 | 0.3 |
| OFFSET AMOUNT $L_{N2}$ OF SECOND NARROW SHALLOW GROOVE /LENGTH $L_B$ OF BLOCK PORTION | - | - | 0.2 | 0.2 | 0.2 | 0.2 | 0.05 |
| MAXIMUM GROOVE DEPTH $D_{N1}$ OF FIRST NARROW SHALLOW GROOVE (mm) | - | 5.0 | 5.0 | 5.0 | 5.0 | 5.0 | 5.0 |
| MAXIMUM GROOVE DEPTH $D_{N2}$ OF SECOND NARROW SHALLOW GROOVE (mm) | - | - | 5.0 | 5.0 | 5.0 | 5.0 | 5.0 |
| MAXIMUM DEPTH $D_{SC}$ OF CIRCUMFERENTIAL SIPE /MAXIMUM DEPTH D OF CIRCUMFERENTIAL MAIN GROOVE | 0.45 | 0.45 | 0.45 | 0.45 | 0.45 | 0.45 | 0.45 |
| MAXIMUM DEPTH $D_{SE}$ OF RIB EDGE SIPE /MAXIMUM DEPTH D OF CIRCUMFERENTIAL MAIN GROOVE | 0.55 | 0.55 | 0.55 | 0.55 | 0.55 | 0.55 | 0.55 |
| ANGLE α OF SECOND NARROW SHALLOW GROOVE IS ACUTE | - | - | NO | NO | NO | NO | NO |
| ANGLE β OF RIB EDGE SIPE IS ACUTE | NO | NO | NO | NO | NO | NO | NO |
| UNEVEN WEAR RESISTANCE | 100 | 103 | 105 | 105 | 106 | 106 | 107 |

FIG. 12A

| | EXAMPLE 2-6 | EXAMPLE 2-7 | EXAMPLE 2-8 | EXAMPLE 2-9 | EXAMPLE 2-10 | EXAMPLE 2-11 | EXAMPLE 2-12 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | YES | YES | YES | YES | YES | YES | YES |
| LEFT AND RIGHT SECOND NARROW SHALLOW GROOVES | YES | YES | YES | YES | YES | YES | YES |
| OFFSET AMOUNT $L_{N2}$ OF SECOND NARROW SHALLOW GROOVE /DISTANCE $L_{SE}$ | 1 | 1 | 1 | 1 | 1 | 1 | 1 |
| OFFSET AMOUNT $L_{N2}$ OF SECOND NARROW SHALLOW GROOVE /LENGTH $L_{SC}$ OF CIRCUMFERENTIAL SIPE | 0.3 | 0.3 | 0.3 | 0.3 | 0.3 | 0.3 | 0.3 |
| OFFSET AMOUNT $L_{N2}$ OF SECOND NARROW SHALLOW GROOVE /LENGTH $L_B$ OF BLOCK PORTION | 0.5 | 0.2 | 0.2 | 0.2 | 0.2 | 0.2 | 0.2 |
| MAXIMUM GROOVE DEPTH $D_{N1}$ OF FIRST NARROW SHALLOW GROOVE (mm) | 5.0 | 5.0 | 0.3 | 5.0 | 4.0 | 1.5 | 1.5 |
| MAXIMUM GROOVE DEPTH $D_{N2}$ OF SECOND NARROW SHALLOW GROOVE (mm) | 5.0 | 5.0 | 5.0 | 0.3 | 5.0 | 5.0 | 0.3 |
| MAXIMUM DEPTH $D_{SC}$ OF CIRCUMFERENTIAL SIPE /MAXIMUM DEPTH D OF CIRCUMFERENTIAL MAIN GROOVE | 0.45 | 0.45 | 0.45 | 0.45 | 0.45 | 0.45 | 0.45 |
| MAXIMUM DEPTH $D_{SE}$ OF RIB EDGE SIPE /MAXIMUM DEPTH D OF CIRCUMFERENTIAL MAIN GROOVE | 0.55 | 0.55 | 0.55 | 0.55 | 0.55 | 0.55 | 0.55 |
| ANGLE α OF SECOND NARROW SHALLOW GROOVE IS ACUTE | NO | NO | NO | NO | NO | NO | NO |
| ANGLE β OF RIB EDGE SIPE IS ACUTE | NO | NO | NO | NO | NO | NO | NO |
| UNEVEN WEAR RESISTANCE | 107 | 110 | 110 | 110 | 112 | 115 | 115 |

FIG. 12B

|  | EXAMPLE 2-13 | EXAMPLE 2-14 | EXAMPLE 2-15 | EXAMPLE 2-16 | EXAMPLE 2-17 | EXAMPLE 2-18 | EXAMPLE 2-19 |
|---|---|---|---|---|---|---|---|
| CIRCUMFERENTIAL SIPE | YES | YES | YES | YES | YES | YES | YES |
| RIB EDGE SIPE | YES | YES | YES | YES | YES | YES | YES |
| FIRST NARROW SHALLOW GROOVE | YES | YES | YES | YES | YES | YES | YES |
| LEFT AND RIGHT SECOND NARROW SHALLOW GROOVES | YES | YES | YES | YES | YES | YES | YES |
| OFFSET AMOUNT $L_{N2}$ OF SECOND NARROW SHALLOW GROOVE /DISTANCE $L_{SE}$ | 1 | 1 | 1 | 1 | 1 | 1 | 1 |
| OFFSET AMOUNT $L_{N2}$ OF SECOND NARROW SHALLOW GROOVE /LENGTH $L_{SC}$ OF CIRCUMFERENTIAL SIPE | 0.3 | 0.3 | 0.3 | 0.3 | 0.3 | 0.3 | 0.3 |
| OFFSET AMOUNT $L_{N2}$ OF SECOND NARROW SHALLOW GROOVE /LENGTH $L_B$ OF BLOCK PORTION | 0.2 | 0.2 | 0.2 | 0.2 | 0.2 | 0.2 | 0.2 |
| MAXIMUM GROOVE DEPTH $D_{N1}$ OF FIRST NARROW SHALLOW GROOVE (mm) | 5.0 | 5.0 | 0.3 | 1.5 | 1.5 | 1.5 | 1.5 |
| MAXIMUM GROOVE DEPTH $D_{N2}$ OF SECOND NARROW SHALLOW GROOVE (mm) | 4.0 | 1.5 | 1.5 | 4.0 | 1.5 | 1.5 | 1.5 |
| MAXIMUM DEPTH $D_{SC}$ OF CIRCUMFERENTIAL SIPE /MAXIMUM DEPTH D OF CIRCUMFERENTIAL MAIN GROOVE | 0.45 | 0.45 | 0.45 | 0.45 | 0.45 | 0.85 | 0.65 |
| MAXIMUM DEPTH $D_{SE}$ OF RIB EDGE SIPE /MAXIMUM DEPTH D OF CIRCUMFERENTIAL MAIN GROOVE | 0.55 | 0.55 | 0.55 | 0.55 | 0.55 | 0.55 | 0.55 |
| ANGLE α OF SECOND NARROW SHALLOW GROOVE IS ACUTE | NO | NO | NO | NO | NO | NO | NO |
| ANGLE β OF RIB EDGE SIPE IS ACUTE | NO | NO | NO | NO | NO | NO | NO |
| UNEVEN WEAR RESISTANCE | 112 | 115 | 115 | 117 | 120 | 120 | 122 |

FIG. 12C

|  | EXAMPLE 2-20 | EXAMPLE 2-21 | EXAMPLE 2-22 | EXAMPLE 2-23 |
|---|---|---|---|---|
| CIRCUMFERENTIAL SIPE | YES | YES | YES | YES |
| RIB EDGE SIPE | YES | YES | YES | YES |
| FIRST NARROW SHALLOW GROOVE | YES | YES | YES | YES |
| LEFT AND RIGHT SECOND NARROW SHALLOW GROOVES | YES | YES | YES | YES |
| OFFSET AMOUNT $L_{N2}$ OF SECOND NARROW SHALLOW GROOVE /DISTANCE $L_{SE}$ | 1 | 1 | 1 | 1 |
| OFFSET AMOUNT $L_{N2}$ OF SECOND NARROW SHALLOW GROOVE /LENGTH $L_{SC}$ OF CIRCUMFERENTIAL SIPE | 0.3 | 0.3 | 0.3 | 0.3 |
| OFFSET AMOUNT $L_{N2}$ OF SECOND NARROW SHALLOW GROOVE /LENGTH $L_B$ OF BLOCK PORTION | 0.2 | 0.2 | 0.2 | 0.2 |
| MAXIMUM GROOVE DEPTH $D_{N1}$ OF FIRST NARROW SHALLOW GROOVE (mm) | 1.5 | 1.5 | 1.5 | 1.5 |
| MAXIMUM GROOVE DEPTH $D_{N2}$ OF SECOND NARROW SHALLOW GROOVE (mm) | 1.5 | 1.5 | 1.5 | 1.5 |
| MAXIMUM DEPTH $D_{SC}$ OF CIRCUMFERENTIAL SIPE /MAXIMUM DEPTH D OF CIRCUMFERENTIAL MAIN GROOVE | 0.65 | 0.65 | 0.65 | 0.65 |
| MAXIMUM DEPTH $D_{SE}$ OF RIB EDGE SIPE /MAXIMUM DEPTH D OF CIRCUMFERENTIAL MAIN GROOVE | 0.95 | 0.75 | 0.75 | 0.75 |
| ANGLE α OF SECOND NARROW SHALLOW GROOVE IS ACUTE | NO | NO | YES | YES |
| ANGLE β OF RIB EDGE SIPE IS ACUTE | NO | NO | NO | YES |
| UNEVEN WEAR RESISTANCE | 122 | 125 | 130 | 135 |

PNEUMATIC TIRE

TECHNICAL FIELD

The present technology relates to a pneumatic tire.

BACKGROUND ART

While a pneumatic tire is formed with groove in a tread surface to ensure mainly drainage properties, the arrangement configuration of the groove also affects the wear characteristics of the tread surface. Thus, some pneumatic tires in the related art have improved wear characteristics by devising an arrangement configuration of grooves. For example, Japan Unexamined Patent Publication No. 2017-007476 describes a pneumatic tire in which a zigzag narrow groove is formed in a rib defined between main grooves extending in the tire circumferential direction and a sipe is formed in a groove bottom of a bent portion of the narrow groove to ensure sideslip resistance and uneven wear resistance even when wear progresses.

Here, in a vehicle often continuously traveling at a relatively high speeds, when uneven wear occurs in initial stages of use after a new pneumatic tire is mounted and started to be used, the pneumatic tire with uneven wear may be removed earlier. That is, uneven wear in the initial stages of use of a new pneumatic tire affects the uneven wear in later stages and affects the service life of the pneumatic tire affected by wear. Thus, in a pneumatic tire mounted on such a vehicle, it is important to suppress uneven wear in the initial stages of use of a new pneumatic tire.

However, a new pneumatic tire includes grooves formed in a tread surface, each of which has a deep groove depth, so that when the tread surface comes into contact with a road surface, a land portion defined by the grooves is likely to flex greatly. This causes a new pneumatic tire to be likely to have uneven wear due to a land portion flexing greatly. As described above, uneven wear is likely to occur in initial stages of use of a new pneumatic tire. Thus, it is very difficult to extend the service life of a pneumatic tire affected by wear by suppressing uneven wear caused by initial uneven wear of a new pneumatic tire by suppressing the uneven wear in the initial stages of use of the new pneumatic tire.

SUMMARY

The present technology provides a pneumatic tire that can provide improved uneven wear resistance to extend wear life.

A pneumatic tire according to an embodiment of the present technology includes:

a plurality of circumferential main grooves extending in a tire circumferential direction;

a rib including at least one end in a tire lateral direction defined by the circumferential main grooves;

a plurality of circumferential sipes extending in the tire circumferential direction, formed in the rib at intervals in the tire circumferential direction;

a plurality of rib edge sipes formed in the rib aligning in the tire circumferential direction, each of the rib edge sipes including a terminating end portion terminating in the rib, and an opening end portion opening to one of the circumferential main grooves;

a plurality of first narrow shallow grooves extending in the tire circumferential direction, each of the first narrow shallow grooves having a groove depth shallower than depths of the circumferential sipes and the rib edge sipes, and including ends each connected to one of the circumferential sipes adjacent to each other in the tire circumferential direction; and a plurality of second narrow shallow grooves each formed at a groove depth shallower than the depths of the circumferential sipes and the rib edge sipes, each of the second narrow shallow grooves including an inner connection portion that is an end portion connected to one of the first narrow shallow grooves, and including an outer connection portion that is an end portion connected to one of the rib edge sipes.

A pneumatic tire according to an embodiment of the present technology includes:

a plurality of circumferential main grooves extending in a tire circumferential direction;

a rib including at least one end in a tire lateral direction defined by the circumferential main grooves;

a plurality of circumferential sipes extending in the tire circumferential direction, formed in the rib at intervals in the tire circumferential direction;

a plurality of rib edge sipes formed in the rib aligning in the tire circumferential direction, each of the rib edge sipes including a terminating end portion terminating in the rib, and an opening end portion opening to one of the circumferential main grooves;

a plurality of first narrow shallow grooves extending in the tire circumferential direction, each of the first narrow shallow grooves having a groove depth shallower than depths of the circumferential sipes and the rib edge sipes, and including ends each connected to one of the circumferential sipes adjacent to each other in the tire circumferential direction; and a plurality of second narrow shallow grooves each formed at a groove depth shallower than the depths of the circumferential sipes and the rib edge sipes, each including an inner connection portion that is an end portion connected to the one of the first narrow shallow grooves or one of the circumferential sipes, and including an outer connection portion that is an end portion connected to one of the rib edge sipes, the plurality of second narrow shallow grooves being disposed on respective sides across the one of the first narrow shallow grooves or the one of the circumferential sipes, in the tire lateral direction, the plurality of second narrow shallow grooves disposed on respective sides across the one of the first narrow shallow grooves or the circumferential sipes in the tire lateral direction including the inner connection portions displaced from each other in the tire circumferential direction.

In the pneumatic tire described above, preferably, the plurality of second narrow shallow grooves have a relationship between an offset amount $L_{N2}$ between the inner connection portions and a distance $L_{SE}$ in the tire circumferential direction between the opening end portions of the rib edge sipes adjacent to each other in the tire circumferential direction, being in a range $0.5 \leq (L_{N2}/L_{SE}) \leq 2.0$.

In the pneumatic tire described above, preferably, the plurality of second narrow shallow grooves have a relationship between an offset amount $L_{N2}$ between the inner connection portions and a length $L_{SC}$ of the circumferential sipes in the tire circumferential direction, being in a range $0.1 \leq (L_{N2}/L_{SC}) \leq 0.6$.

In the pneumatic tire described above, preferably, the rib is formed with a plurality of block portions each including:

one end in the tire lateral direction defined by the one of the circumferential sipes and the one of the first narrow shallow grooves;

an other end in the tire lateral direction defined by the one of the circumferential main grooves; and both sides in the tire circumferential direction defined by the one of the rib edge sipes and the one of the second narrow shallow grooves, respectively, and the plurality of the second narrow shallow grooves have a relationship between an offset amount $L_{N2}$ between the inner connection portions and a length $L_B$ of the block portions in the tire circumferential direction, being in a range $0.1 \leq (L_{N2}/L_B) \leq 0.4$.

In the pneumatic tire described above, preferably, the first narrow shallow grooves have a maximum groove depth $D_{N1}$ in a range 0.5 mm $\leq D_{N1} \leq$ 4.0 mm.

In the pneumatic tire described above, preferably, the second narrow shallow grooves have a maximum groove depth $D_{N2}$ in a range 0.5 mm $\leq D_{N2} \leq$ 4.0 mm.

In the pneumatic tire described above, preferably, the circumferential sipes have a relationship between a maximum depth $D_{SC}$ of the circumferential sipes and a maximum groove depth $D$ of the circumferential main grooves, being in a range $0.50 \leq (D_{SC}/D) \leq 0.80$.

In the pneumatic tire described above, preferably, the rib edge sipes have a relationship between a maximum depth $D_{SE}$ of the rib edge sipes and a maximum groove depth $D$ of the circumferential main grooves, being in a range $0.60 \leq (D_{SE}/D) \leq 0.90$.

In the pneumatic tire described above, preferably, the second narrow shallow grooves are each inclined in the tire lateral direction from a front side in a tire rotation direction toward a rear side in the tire rotation direction, from the inner connection portion side toward the outer connection portion side.

In the pneumatic tire described above, preferably, the rib edge sipes are each inclined in the tire lateral direction from a front side in a tire rotation direction toward a rear side in the tire rotation direction, from the terminating end portion side toward the opening end portion side.

In the pneumatic tire described above, preferably, the circumferential sipes and the first narrow shallow grooves have a relationship between a length $L_{SC}$ of the circumferential sipes in the tire circumferential direction and a length $L_{N1}$ of the first narrow shallow grooves in the tire circumferential direction, being in a range $0.4 \leq (L_{N1}/L_{SC}) \leq 0.8$.

The pneumatic tire according to an embodiment of the present technology can achieve an effect of improving uneven wear resistance to extend wear life.

BRIEF DESCRIPTION OF DRAWINGS

FIG. 11A is a table showing results of first performance tests of pneumatic tires.

FIG. 11B is a table showing results of the first performance tests of pneumatic tires.

FIG. 11C is a table showing results of the first performance tests of pneumatic tires.

FIG. 12A is a table showing results of second performance tests of pneumatic tires.

FIG. 12B is a table showing results of the second performance tests of pneumatic tires.

FIG. 12C is a table showing results of the second performance tests of pneumatic tires.

FIG. 12D is a table showing results of the second performance tests of pneumatic tires.

DETAILED DESCRIPTION

Pneumatic tires according to embodiments of the present technology will be described in detail below with reference to the drawings. However, the present technology is not limited by the embodiments. Constituents of the following embodiments include elements that are essentially identical or that can be substituted or easily conceived by one skilled in the art.

In the following description, "tire lateral direction" refers to the direction that is parallel with a rotation axis of a pneumatic tire. "Inward in the tire lateral direction" refers to the direction toward a tire equator line in the tire lateral direction. "Outward in the tire lateral direction" refers to the direction opposite the direction toward the tire equator line in the tire lateral direction. In addition, "tire radial direction" refers to the direction orthogonal to the tire rotation axis, and "tire circumferential direction" refers to the direction of rotation about the tire rotation axis. "Tire equator line" refers to a line along the tire circumferential direction of the pneumatic tire, in the tire equatorial plane orthogonal to the tire rotation axis and passing through a center of a tire width of the pneumatic tire. "Tire width" is a width in the tire lateral direction between portions positioned outward in the tire lateral direction, i.e., a distance between portions most away from the tire equatorial plane in the tire lateral direction.

Figure 1:
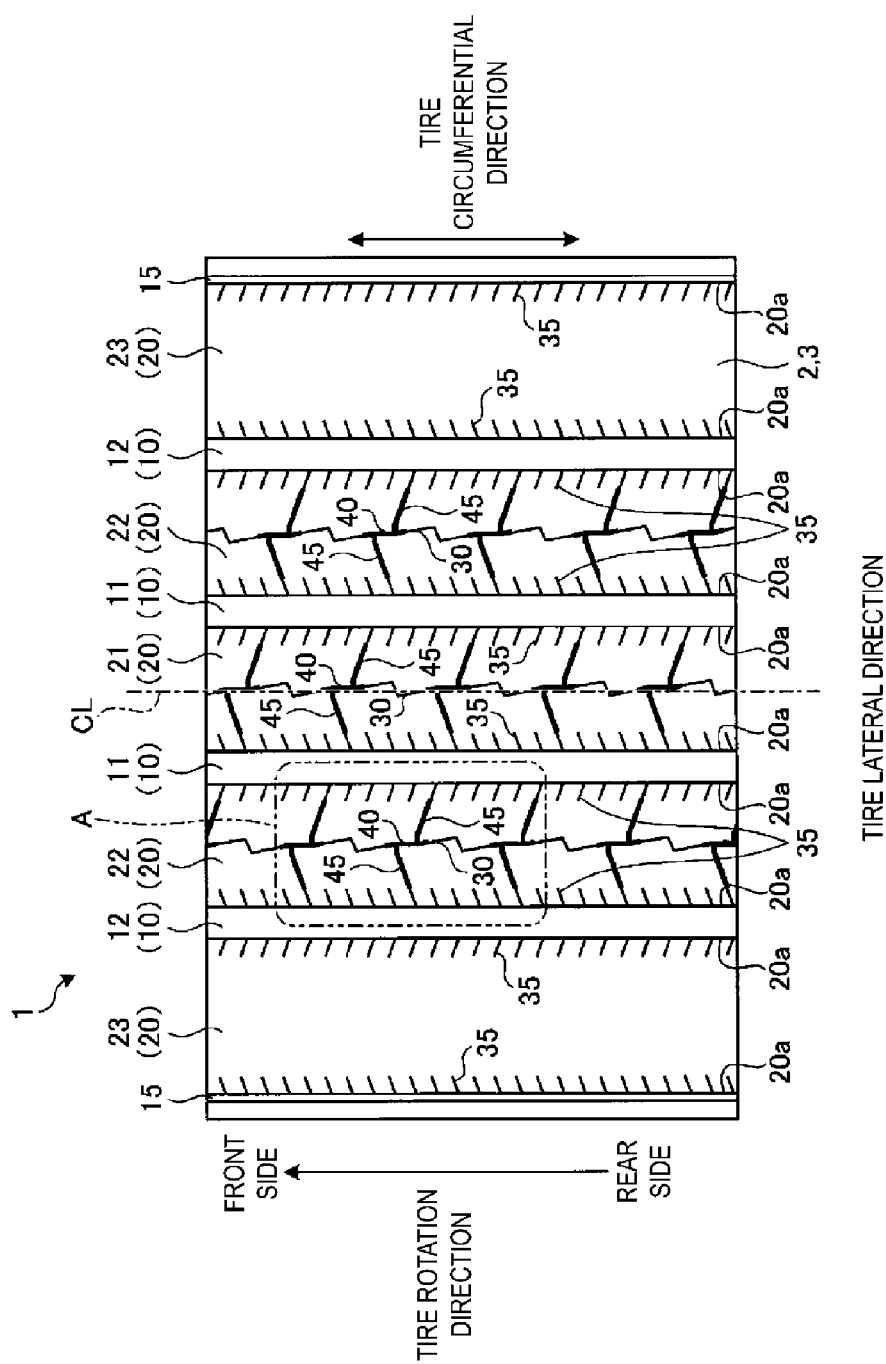
FIG. 1 is a plan view illustrating a tread surface of a pneumatic tire according to an embodiment.

FIG. 1 is a plan view illustrating a tread surface 3 of a pneumatic tire 1 according to an embodiment. The pneumatic tire 1 illustrated in FIG. 1 is provided in its outermost portion in the tire radial direction with a tread portion 2. The tread portion 2 has a surface, i.e., a portion that comes into contact with a road surface when a vehicle (not illustrated) mounted with the pneumatic tire 1 travels, being formed as the tread surface 3. The tread surface 3 is formed with a plurality of circumferential main grooves 10 extending in the tire circumferential direction, and with a plurality of circumferential narrow grooves 15 extending in the tire circumferential direction, each having a groove width narrower than a groove width of each of the circumferential main grooves 10. The tread surface 3 is also formed with a plurality of ribs 20 that are land portions extending in the tire circumferential direction and that are defined by the plurality of circumferential main grooves 10 and the plurality of circumferential narrow grooves 15. Each of the ribs 20 includes at least one end in the tire lateral direction that is defined by one of the circumferential main grooves 10.

Specifically, the plurality of circumferential main grooves 10 includes four circumferential main grooves 10 formed side by side in the tire lateral direction, including two center circumferential main grooves 11 positioned on either side of a tire equator line CL in the tire lateral direction, and two shoulder circumferential main grooves 12 that are positioned outward of the corresponding center circumferential main groove 11 in the tire lateral direction and that are adjacent to the corresponding center circumferential main groove 11. The circumferential narrow grooves 15 include two circumferential narrow grooves 15 that are disposed one by one outward of the corresponding shoulder circumferential main groove 12 in the tire lateral direction. The circumferential main grooves 10 each have a groove width in the range from 4.0 mm to 20.0 mm, and a groove depth in the range from 10.0 mm to 28.0 mm. The circumferential narrow grooves 15 each have a groove width in the range from 1.0 mm to 4.0 mm, and a groove depth in the range from 8.0 mm to 28.0 mm.

The ribs 20 include: a center rib 21 disposed on the tire equator line CL, being positioned between the two center circumferential main grooves 11; a second rib 22 positioned between the corresponding one of the center circumferential main grooves 11 and the corresponding one of the shoulder circumferential main grooves 12, adjacent to each other; and a shoulder rib 23 positioned between the corresponding one of the shoulder circumferential main grooves 12 and the corresponding one of the circumferential narrow grooves 15, adjacent to each other. In other words, the center rib 21 and the second rib 22 each have both sides defined by the corresponding circumferential main grooves 10, and the shoulder rib 23 includes one end in the tire lateral direction defined by the corresponding one of the circumferential main grooves 10.

Each of the ribs 20 formed as described above is formed with rib edge sipes 35 each extending in the tire lateral direction with a relatively short length, including one end terminating in the rib 20, and the other end opening to the corresponding one of the circumferential main groove 10 or the corresponding one of the circumferential narrow grooves 15. In other words, the rib edge sipes 35 are connected to a rib edge 20a positioned at an edge of each of the ribs 20 in the tire lateral direction, at which the tread surface 3 of each of the ribs 20 intersects a groove wall of the corresponding one of the circumferential main grooves 10 or a groove wall of the corresponding one of the circumferential narrow grooves 15. The rib edge sipes 35 of each of the ribs 20 are each formed in a linear shape inclined in the tire circumferential direction with respect to the tire lateral direction, and are disposed side by side in the tire circumferential direction on both end sides of each of the ribs 20 in the tire lateral direction.

For example, the center rib 21 is provided on its side near one of the two center circumferential main grooves 11 defining the center rib 21 with first rib edge sipes 35, and on its side near the other thereof with second rib edge sipes 35. Each of the first and second rib edge sipes 35 has one end terminating in the center rib 21 and the other end opening to the corresponding two center circumferential main grooves 11. The second rib 22 is provided on its side near the corresponding one of the center circumferential main grooves 11 with first rib edge sipes 35, and on its side near the corresponding one of the shoulder circumferential main grooves 12 with second rib edge sipes 35. Each of the first and second rib edge sipes 35 has one end terminating in the second rib 22 and the other end opening to the corresponding one of the center circumferential main grooves 11 or of the shoulder circumferential main grooves 12. The shoulder rib 23 is provided on its side near the corresponding one of the shoulder circumferential main grooves 12 with first rib edge sipes 35, and on its side near the corresponding one of the circumferential narrow groove 15 with second rib edge sipes 35. Each of the first and second rib edge sipes 35 has one end terminating in the shoulder rib 23 and the other end opening to the corresponding one of the shoulder circumferential main grooves 12 or of the circumferential narrow grooves 15.

The plurality of ribs 20 includes the center rib 21 and the second rib 22 that are positioned inward of the shoulder circumferential main grooves 12 in the tire lateral direction, and each of which has both ends in the tire lateral direction defined by the corresponding circumferential main grooves 10. The center rib 21 and the second rib 22 are each formed with circumferential sipes 30, first narrow shallow grooves 40, and second narrow shallow grooves 45. Two second ribs 22 including the second rib 22, and the center rib 21 are each formed with the circumferential sipes 30 with the same form, the first narrow shallow grooves 40 with the same form, and the second narrow shallow grooves 45 with the same form.

Figure 2:
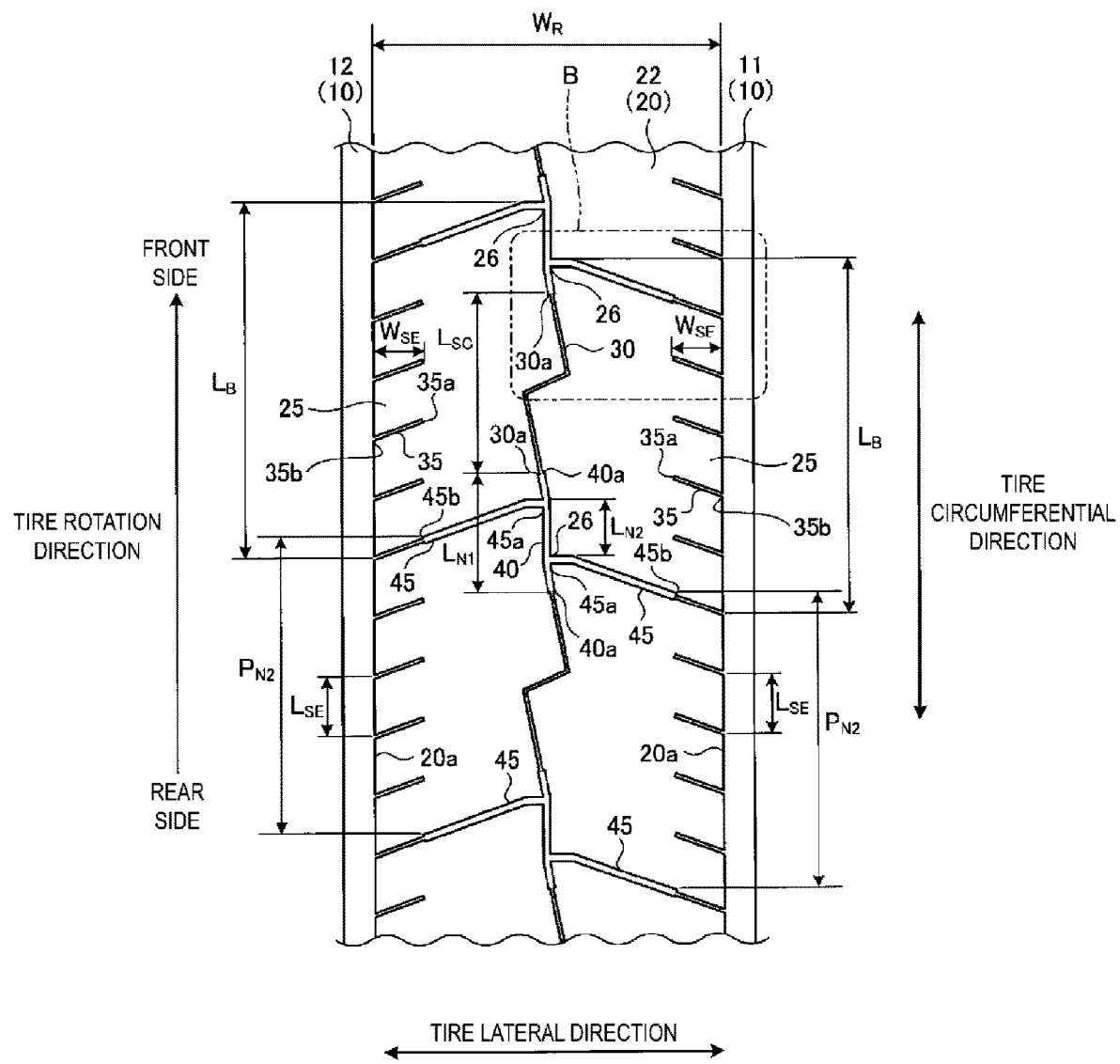
FIG. 2 is a detailed view of portion A of FIG. 1.

FIG. 2 is a detailed view of portion A of FIG. 1. The circumferential sipe 30, the rib edge sipe 35, the first narrow shallow groove 40, and the second narrow shallow groove 45 will be described using one of the two second ribs 22 as a representative of the two second ribs 22 and the center rib 21. Among the circumferential sipe 30, the circumferential sipe 35, the first narrow shallow groove 40, and the second narrow shallow groove 45, a plurality of the circumferential sipes 30 is formed in the second rib 22 at intervals in the tire circumferential direction, while extending in the tire circumferential direction in a central region of the second rib 22 in the tire lateral direction. The circumferential sipes 30 each extend in the tire circumferential direction, and each bend at two places in a central region in the tire circumferential direction. Specifically, the circumferential sipes 30 each extend in the tire circumferential direction, and each bend in a zigzag manner in the tire lateral direction, or are formed in a substantially crank shape while extending in the tire circumferential direction. The rib edge sipe 35 includes a terminating end portion 35a formed extending in the tire lateral direction and terminating in the second rib 22, and an opening end portion 35b opening to the circumferential main groove 10.

The sipe described herein refers to that formed in a narrow groove shape in the tread surface 3 such that when the pneumatic tire 1 is mounted on a regular rim and is inflated to the regular internal pressure, wall surfaces constituting the narrow groove do not come into contact with each other without a load, however, when the narrow groove is positioned in a portion of a ground contact surface formed on a flat plate when a load is vertically applied on the flat plate, or when a land portion formed with the narrow groove flexes, the wall surfaces constituting the narrow groove come into contact with each other, or at least portions provided in the wall surfaces partly come contact with each other, due of deformation of the land portion. The circumferential sipes 30 and the circumferential sipes 35 are each included in the sipe defined as described above.

"Regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO.

In the present embodiment, the circumferential sipes 30 each have a width in the range from 0.3 mm to 0.8 mm, and a depth in the range from 7.0 mm to 11.5 mm. The rib edge sipes 35 each have a width in the range from 0.3 mm to 0.8 mm, and a depth in the range from 8.5 mm to 13.0 mm.

Additionally, a plurality of the first narrow shallow grooves 40 are formed in the second rib 22. Each of the first narrow shallow grooves 40 extends in the tire circumferential direction, and both ends of each of the first narrow shallow grooves 40 are connected to the corresponding circumferential sipes 30 adjacent to each other in the tire circumferential direction. Specifically, the first narrow shallow groove 40 extending in the tire circumferential direction is disposed in a central region in the tire lateral direction of the second rib 22 as with the circumferential sipe 30, and is connected at its end portion 40a in the tire circumferential direction to an end portion 30a in the tire circumferential of the circumferential sipe 30 extending in the tire circumferential direction. The first narrow shallow grooves 40 also extend in the tire circumferential direction in a zigzag manner corresponding to the circumferential sipes 30 inclined from the tire circumferential direction, and each have at least a portion near the end portion 40a that is inclined in the tire lateral direction with respect to the tire circumferential direction while aligning with the corresponding one of the circumferential sipes 30.

The first narrow shallow groove 40 is disposed at every portion between the circumferential sipes 30 adjacent to each other at an interval in the tire circumferential direction. Each first narrow shallow groove 40 is connected at the end portion 40a to the corresponding one of the end portions 30a of the respective circumferential sipes 30 positioned on both side across the first narrow shallow groove 40 in the tire circumferential direction. The first narrow shallow grooves 40 are each formed in this manner having a groove width more than a width of each of the circumferential sipes 30 and the circumferential sipes 35, and a groove depth less than depths of the circumferential sipes 30 and the circumferential sipes 35.

The circumferential sipes 30 and the first narrow shallow grooves 40 have a relationship between the length $L_{SC}$ of each of the circumferential sipes 30 in the tire circumferential direction and the length $L_{N1}$ of each of the first narrow shallow grooves 40 in the tire circumferential direction, being in the range $0.4 \leq (L_{N1}/L_{SC}) \leq 0.8$. While a plurality of the circumferential sipes 30 and the first narrow shallow grooves 40 is provided, each of the circumferential sipes 30 as well as each of the first narrow shallow grooves 40 may be different in length. Regardless of a relationship between lengths $L_{SC}$ of the respective circumferential sipes 30, and a relationship between lengths $L_{N1}$ of the respective first narrow shallow grooves 40, the circumferential sipes 30 and the first narrow shallow grooves 40 may have a relationship between the lengths $L_{SC}$ and $L_{N1}$ in the tire circumferential direction of the circumferential sipe 30, and the first narrow shallow groove 40, which are connected to each other, being in the range $0.4 \leq (L_{N1}/L_{SC}) \leq 0.8$.

Additionally, a plurality of the second narrow shallow grooves 45 are formed in the second rib 22 and are disposed on respective sides in the tire lateral direction of the respective first narrow shallow grooves 40d while extending in the tire lateral direction. Specifically, the second narrow shallow grooves 45 are disposed one by one on respective sides in the tire lateral direction of each of the first narrow shallow grooves 40. Thus, the two second narrow shallow grooves 45 are connected to the one first narrow shallow grooves 40. The second narrow shallow groove 45 disposed on respective sides in the tire lateral direction across the first narrow shallow groove 40 is formed from the first narrow shallow groove 40 to the rib edge sipe 35, and is connected at one end to the first narrow shallow groove 40 and at the other end to the rib edge sipe 35. In other words, the second narrow shallow groove 45 includes an inner connection portion 45a that is an end portion connected to the first narrow shallow groove 40, and an outer connection portion 45b that is an end portion connected to the rib edge sipe 35. The inner connection portion 45a is an end portion positioned on a center side of the second rib 22 in the width direction of both end portions of the second narrow shallow groove 45 extending in the tire lateral direction, and the outer connection portion 45b is an end portion positioned close to the rib edge 20a of the second narrow shallow groove 45 in the width direction of the both end portions of the second narrow shallow groove 45.

The two second narrow shallow grooves 45 connected to the one first narrow shallow grooves 40 are disposed at respective positions different from each other in the tire circumferential direction, i.e., the two second narrow shallow grooves 45 connected to the one first narrow shallow groove 40 are disposed displaced in the tire circumferential direction. In other words, the plurality of second narrow shallow grooves 45 disposed on the respective sides in the tire lateral direction across the first narrow shallow groove 40 include the respective inner connection portion 45a at positions displaced from each other in the tire circumferential direction.

In addition, while extending in the tire lateral direction aligning with the rib edge sipe 35 inclined from the tire lateral direction, the second narrow shallow groove 45 has at least a portion near the outer connection portion 45b connected to the rib edge sipe 35, being inclined in the tire circumferential direction with respect to the tire lateral direction aligning with the rib edge sipe 35. In the present embodiment, the second narrow shallow groove 45 is bent near the inner connection portion 45a connected to the first narrow shallow groove 40, so that most of the second narrow shallow groove 45 is inclined at approximately the same angle as an inclination angle of the rib edge sipe 35.

The inner connection portion 45a, which is one of both ends of second narrow shallow groove 45, being connected to the first narrow shallow groove 40, is connected at a position different from the end portion 40a of the first narrow shallow groove 40. Thus, the two second narrow shallow grooves 45 connected at the respective inner connection portions 45a to the one first narrow shallow groove 40, the inner connection portions 45a being positioned at respective positions different from each other in the tire circumferential direction between the both end portions 40a of the one first narrow shallow grooves 40. A relative positional relationship between the two second narrow shallow grooves 45 connected to the first narrow shallow grooves 40 in the tire circumferential direction is identical to every first narrow shallow groove 40. For example, while in FIG. 2, the second narrow shallow groove 45 connected to the first narrow shallow groove 40 from the left side is positioned above the second narrow shallow groove 45 connected to the first narrow shallow groove 40 from the right side in the drawing, the same relative positional relationship between two second narrow shallow grooves 45 connected to the same first narrow shallow groove 40 in the tire circumferential direction applies to every first narrow shallow groove 40 that is not illustrated.

The outer connection portion 45b, which is an end portion of the second narrow shallow groove 45, connected to the rib edge sipe 35, is connected to the terminating end 35a of one of the plurality of rib edge sipes 35 aligned in the tire circumferential direction. In other words, the rib edge sipes 35 are formed on both ends side of the second rib 22 in the tire lateral direction, so that the rib edge sipes 35 are disposed on respective sides across the first narrow shallow groove 40 in the tire lateral direction as with the second narrow shallow grooves 45. Thus, the second narrow shallow grooves 45 are connected to the corresponding rib edge sipes 35 positioned on the same side across the first narrow shallow groove 40 in the tire lateral direction. As with the first narrow shallow groove 40, the second narrow shallow groove 45 formed as described above have a groove width wider than widths of the circumferential sipe 30 and the rib edge sipe 35, and a groove depth shallower than depths of the circumferential sipe 30 and the rib edge sipe 35.

The rib edge sipes 35 formed on both end sides in the tire lateral direction of the second rib 22 are each formed such that a width $W_{SE}$ in the tire lateral direction is in the range $0.05 \leq (W_{SE}/W_R) \leq 0.25$ with respect to a width $W_R$ of the rib 20. A relationship between a distance $L_{SE}$ in the tire circumferential direction between the opening end portions 35b of the respective rib edge sipes 35 adjacent to each other in the tire circumferential direction in the plurality of rib edge sipes 35 aligning in the tire circumferential direction, and a pitch $P_{N2}$ in the tire circumferential direction between the second narrow shallow grooves 45 adjacent to each other in the tire circumferential direction, is in the range $2.5 \leq (P_{N2}/L_{SE}) \leq 7.5$. The pitch $P_{N2}$ between the second narrow shallow grooves 45 adjacent to each other in the tire circumferential direction is preferably an integer multiple of the distance $L_{SE}$ in the tire circumferential direction between the opening end portions 35b of the respective rib edge sipes 35.

A relationship between the offset amount $L_{N2}$ in the tire circumferential direction between the inner connection portions 45a of the respective two second narrow shallow grooves 45 connected to the same first narrow shallow groove 40, and the distance $L_{SE}$ in the tire circumferential direction between the opening end portions 35b of the respective rib edge sipes 35 adjacent to each other in the tire circumferential direction, is in the range $0.5 \leq L_{N2}/L_{SE} \leq 2.0$. A relationship between the offset amount $L_{N2}$ between the inner connection portions 45a of the respective two second narrow shallow grooves 45, and the length $L_{SC}$ of the circumferential sipe 30 in the tire circumferential direction, is in the range $0.1 \leq (L_{N2}/L_{SC}) \leq 0.6$. In addition, a relationship between the length $L_{N1}$ of the first narrow shallow groove 40 in the tire circumferential direction, and the offset amount $L_{N2}$ in the tire circumferential direction between the inner connection portions 45a of the respective two second narrow shallow grooves 45 connected to the first narrow shallow groove 40, is in the range $0.3 \leq (L_{N2}/L_{N1}) \leq 0.7$.

In this case, the offset amount $L_{N2}$ between the inner connection portions 45a is a distance in the tire circumferential direction between the inner connection portions 45a of the respective second narrow shallow grooves 45 closest to each other in the tire circumferential direction, in the inner connection portions 45a of the respective second narrow shallow grooves 45 different in position in the tire circumferential direction. The relationship between the offset amount $L_{N2}$ in the tire circumferential direction between the inner connection portions 45a of the respective two second narrow shallow grooves 45, and the distance $L_{SE}$ in the tire circumferential direction between the opening end portions 35b of the respective rib edge sipes 35 adjacent to each other in the tire circumferential direction, is preferably in the range $0.8 \leq (L_{N2}/L_{SE}) \leq 1.5$. In addition, the relationship between the offset amount $L_{N2}$ in the tire circumferential direction between the inner connection portions 45a of the respective two second narrow shallow grooves 45, and the length $L_{SC}$ of the circumferential sipe 30 in the tire circumferential direction, is preferably in the range $0.2 \leq (L_{N2}/L_{SC}) \leq 0.5$.

The second rib 22 is formed with a plurality of block portions 25 defined in a block-like shape by the circumferential sipes 30, the rib edge sipes 35, the first narrow shallow grooves 40, and the second narrow shallow grooves 45, being formed in the second rib 22 as described above. In other words, the second rib 22 at a position near the tread surface 3 is divided into the plurality of block portions 25 by the circumferential sipes 30, the rib edge sipes 35, the first narrow shallow grooves 40, and the second narrow shallow grooves 45. Each of the block portions 25 has one end in the tire lateral direction defined by the circumferential sipe 30 and the first narrow shallow groove 40, the other end in the tire lateral direction defined by the circumferential main groove 10, and both sides in the tire circumferential direction each of which is defined by the rib edge sipe 35 and the second narrow shallow groove 45, and thus is formed in a shape close to a rectangle.

The plurality of block portions 25 is formed aligning in the tire circumferential direction on respective sides in the tire lateral direction across the circumferential sipes 30 and the first narrow shallow grooves 40. Additionally, the block portions 25 are disposed displaced from each other in the tire circumferential direction because the two second narrow shallow grooves 45 connected to the same first narrow shallow groove 40 are disposed at respective positions different in the tire circumferential direction to allow the block portions 25 on the respective sides in the tire lateral direction across the circumferential sipes 30 and the first narrow shallow grooves 40 to be disposed at positions different from each other in the tire circumferential direction. In other words, the plurality of block portions 25 disposed aligning in the tire circumferential direction on one side in the tire lateral direction across the circumferential sipes 30 and the first narrow shallow grooves 40, and the plurality of block portions 25 disposed aligning in the tire circumferential direction on the other side in the tire lateral direction, are generally disposed at respective positions displaced from each other in the tire circumferential direction.

Each of the block portions 25 is also formed such that the circumferential sipe 30 and corners 26 positioned on respective first narrow shallow groove 40 sides are all defined by the corresponding first narrow shallow groove 40 and second narrow shallow grooves 45. In other words, each of the block portions 25 has a portion in the tire lateral direction where the circumferential sipe 30 and the first narrow shallow grooves 40 are positioned, and in the portion, the second narrow shallow grooves 45 are not connected to the circumferential sipe 30, and the second narrow shallow grooves 45 are only connected to the respective first narrow shallow grooves 40. Thus, in the portion of each of the block portions 25 where the circumferential sipe 30 and the first narrow shallow grooves 40 are positioned, the corners 26 are all defined by the corresponding first narrow shallow grooves 40 and second narrow shallow grooves 45, and intersections of the corresponding first narrow shallow grooves 40 and second narrow shallow grooves 45 serve as the respective corners 26 of the block portion 25.

As described above, the second narrow shallow grooves 45 disposed on respective sides in the tire lateral direction across the respective first narrow shallow grooves 40 are displaced from each other in the tire circumferential direction, so that the corners 26 defined by the corresponding first narrow shallow grooves 40 and the second narrow shallow grooves 45 in each of the block portions 25 on respective sides in the tire lateral direction, are positioned in the tire circumferential direction while being displaced from each other in the tire circumferential direction. In addition, the plurality of second narrow shallow grooves 45 with the respective inner connection portions 45a displaced from each other in the tire circumferential direction have a relationship between the offset amount $L_{N2}$ between the inner connection portions 45a and the length $L_B$ of the block portion 25 in the tire circumferential direction, being in the range $0.1 \leq (L_{N2}/L_B) \leq 0.4$.

Figure 3:
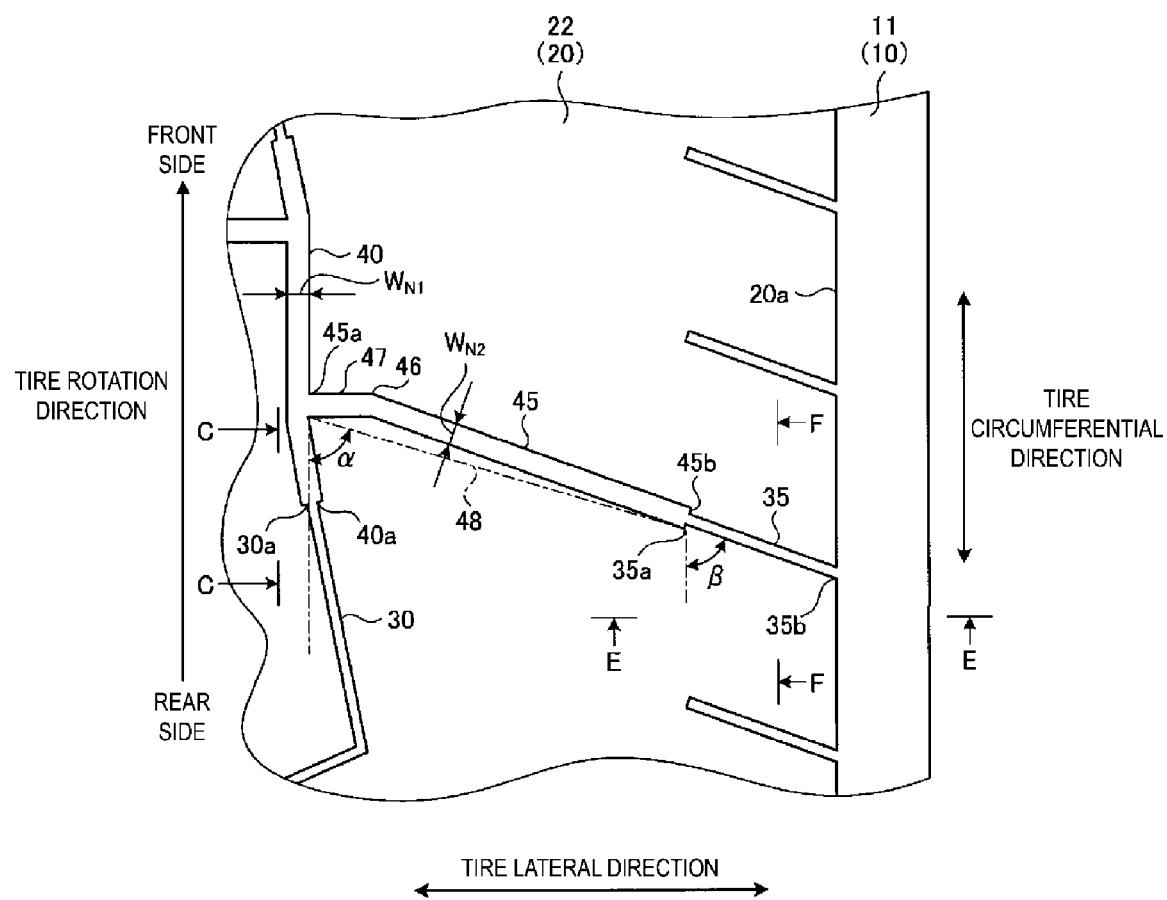
FIG. 3 is a detailed view of portion B of FIG. 2.
Figure 4:
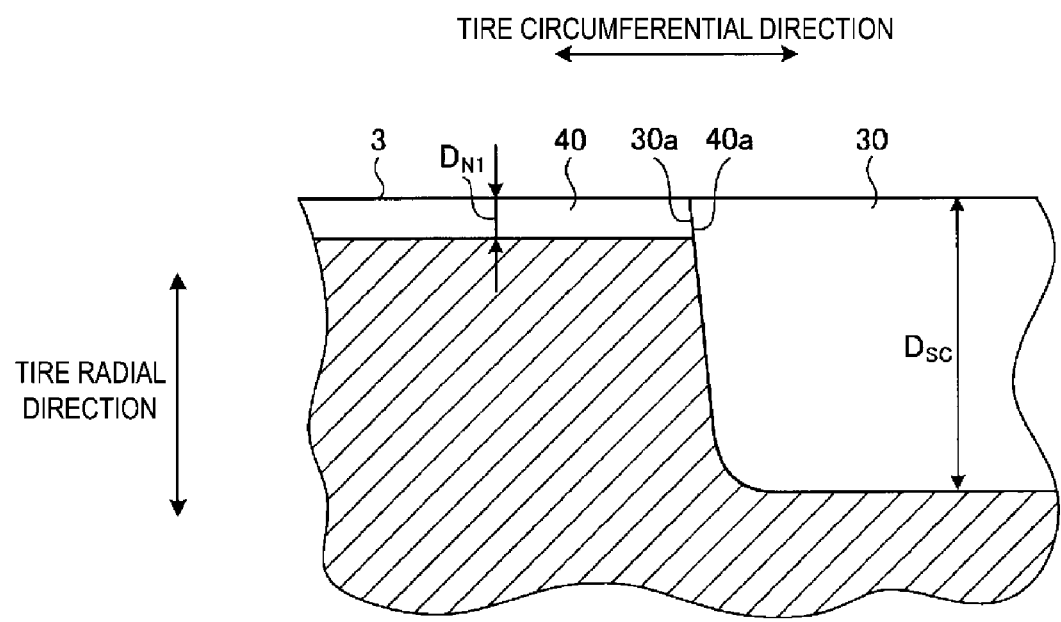
FIG. 4 is an explanatory diagram of a circumferential sipe and a first narrow shallow groove as viewed in C-C direction of FIG. 3.
Figure 5:
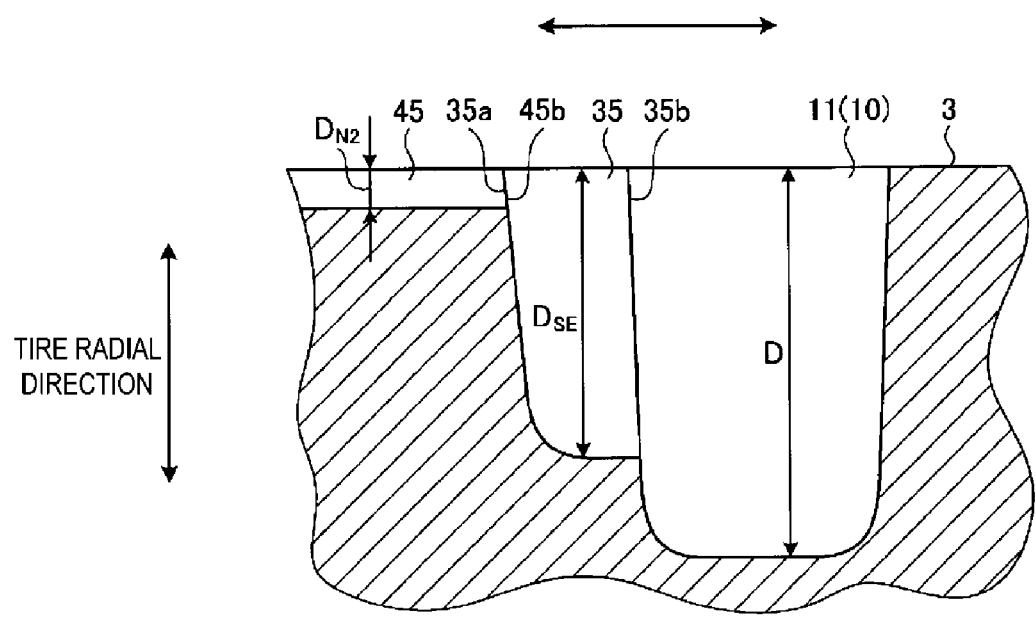
FIG. 5 is an explanatory diagram of a rib edge sipe, a second narrow shallow groove, and a circumferential main groove as viewed in E-E direction of FIG. 3.

FIG. 3 is a detailed view of portion B of FIG. 2. FIG. 4 is an explanatory diagram of the circumferential sipe 30 and the first narrow shallow groove 40 as viewed in C-C direction of FIG. 3. FIG. 5 is an explanatory diagram of the rib edge sipe 35, the second narrow shallow groove 45, and the circumferential main groove 10 as viewed in E-E direction of FIG. 3. The first narrow shallow groove 40 has a groove width wider than widths of the circumferential sipes 30 and the rib edge sipe 35, and a groove depth shallower than depths of the circumferential sipes 30 and the rib edge sipe 35. Then, the first narrow shallow groove 40 has a groove width $W_{N1}$ in the range 0.5 mm $\leq W_{N1} \leq 2.0$ mm, and a maximum groove depth $D_{N1}$ in the range 0.5 mm $\leq D_{N1} \leq 4.0$ mm. Likewise, the second narrow shallow groove 45 has a groove width wider than widths of the circumferential sipes 30 and the rib edge sipe 35, and a groove depth shallower than depths of the circumferential sipes 30 and the rib edge sipe 35. Then, the second narrow shallow groove 45 has a groove width $W_{N2}$ in the range 0.5 mm $\leq W_{N2} \leq 2.0$ mm, and a maximum groove depth $D_{N2}$ in the range 0.5 mm $\leq D_{N2} \leq 4.0$ mm. The groove width $W_{N1}$ of the first narrow shallow grooves 40 and the groove width $W_{N2}$ of the second narrow shallow groove 45 are almost identical to each other, and the maximum groove depth $D_{N1}$ of the first narrow shallow groove 40 and the maximum groove depth $D_{N2}$ of the second narrow shallow groove 45 are almost identical to each other.

The maximum groove depth $D_{N1}$ of the first narrow shallow groove 40 and the maximum groove depth $D_{N2}$ of the second narrow shallow groove 45 are more preferably in the ranges 0.5 mm $\leq D_{N1} \leq 2.5$ mm, and 0.5 mm $\leq D_{N2} \leq 2.5$ mm, respectively.

The circumferential sipe 30 and the circumferential sipe 35 each have a depth less than the groove depth of the circumferential main groove 10, such as the center circumferential main groove 11. Specifically, the circumferential sipe 30 has a relationship between the maximum depth $D_{SC}$ of the circumferential sipe 30 and the maximum groove depth D of the circumferential main groove 10, being in the range $0.50 \leq (D_{SC}/D) \leq 0.80$. In addition, the rib edge sipe 35 has a relationship between the maximum depth $D_{SE}$ of the rib edge sipe 35 and the maximum groove depth D of the circumferential main groove 10, being in the range $0.60 \leq (D_{SE}/D) \leq 0.90$.

The maximum depth $D_{SC}$ of the circumferential sipe 30 with respect to the maximum groove depth D of the circumferential main groove 10 is more preferably in the range $0.60 \leq (D_{SC}/D) \leq 0.70$. The maximum depth $D_{SE}$ of the rib edge sipe 35 with respect to the maximum groove depth D of the circumferential main groove 10 is more preferably in the range $0.70 \leq (D_{SE}/D) \leq 0.80$.

The pneumatic tire 1 according to the present embodiment is a pneumatic tire 1 with a designated rotational direction when mounted on a vehicle. The rotation direction designated in this case is the direction in which the pneumatic tire 1 rotates as the vehicle mounted with the pneumatic tire 1 travels forward. In the following description, "front side in the tire rotation direction" refers to a rotation direction side when the pneumatic tire 1 is rotated in the designated direction. When a vehicle mounted with the pneumatic tire 1 travels while the pneumatic tire 1 is rotated in the designated direction, the front side first comes into contact with a road surface and comes away from the road surface. Then, "rear side in the tire rotation direction" refers to a side opposite to the rotation direction when the pneumatic tire 1 is rotated in the designated direction. When a vehicle mounted with the pneumatic tire 1 travels while the pneumatic tire 1 is rotated in the designated direction, the rear side later comes into contact with a road surface and comes away from the road surface.

The second narrow shallow groove 45 is inclined from the tire lateral direction from the front side in the tire rotation direction toward the rear side in the tire rotation direction, from an inner connection portion 45a side toward the outer connection portion 45b. In other words, the second narrow shallow groove 45 has a portion on the rear side in the tire rotation direction that forms an acute angle α from the tire circumferential direction.

The second narrow shallow groove 45 is bent near the inner connection portion 45a in the present embodiment. In this case, the angle α of the second narrow shallow groove 45 is formed by a straight line 48 connecting both end portions of the second narrow shallow groove 45. That is, the straight line 48 connects the inner connection portion 45a and the outer connection portion 45b, and an angle of the straight line 48 from the tire circumferential direction is used as an angle of the second narrow shallow groove 45. In other words, the second narrow shallow groove 45 is formed bent, so that the straight line 48 connecting the both end portions is used as an element for determining an inclination angle of the second narrow shallow groove 45 by indicating an extension direction of the second narrow shallow groove 45.

Specifically, the second narrow shallow groove 45 is connected orthogonal to the first narrow shallow groove 40, and a range from the inner connection portion 45a to the bent portion 46 forms an orthogonal portion 47 having an angle of approximately 90° to the first narrow shallow groove 40. The second narrow shallow groove 45 has the range from the bent portion 46 to the outer connection portion 45b, being inclined from the tire lateral direction in a direction from the front side in the tire rotation direction toward the rear side in the tire rotation direction, from the inner connection portion 45a side toward the outer connection portion 45b. As described above, the second narrow shallow groove 45 having the bent portion 46 has the straight line 48 connecting the inner connection portion 45a and the outer connection portion 45b and forming an acute angle α from a portion in the tire circumferential direction on the rear side in the tire rotation direction. The orthogonal portion 47 of the second narrow shallow grooves 45 preferably has a length in the range from 1.0 mm to 3.0 mm.

The rib edge sipe 35 is inclined from the tire lateral direction from the front side in the tire rotation direction toward the rear side in the tire rotation direction, from the terminating end portion 35a toward the opening end portion 35b. That is, as with the second narrow shallow groove 45, the rib edge sipe 35 also has a portion on the rear side in the tire rotation direction, forming an acute angle β from the tire circumferential direction. For an angle of the rib edge sipe, a straight line connecting the both end portions of the rib edge sipe 35 is also used as an element for determining an inclination angle of the rib edge sipe 35 by indicating an extension direction of the rib edge sipe 35. The rib edge sipe 35 is formed in a linear shape and overlaps the straight line connecting its both end portions in the present embodiment, so that an angle of the rib edge sipe 35 itself is used as is.

The second narrow shallow groove 45 preferably has an angle α from the tire circumferential direction, being in the range from 60° to 80°, and the rib edge sipe 35 also preferably has an angle β from the tire circumferential direction, being in the range from 60° to 80°. A difference between the angle α of the second narrow shallow groove 45 and the angle β of the rib edge sipe 35 is preferably in the range±10°.

Figure 6:
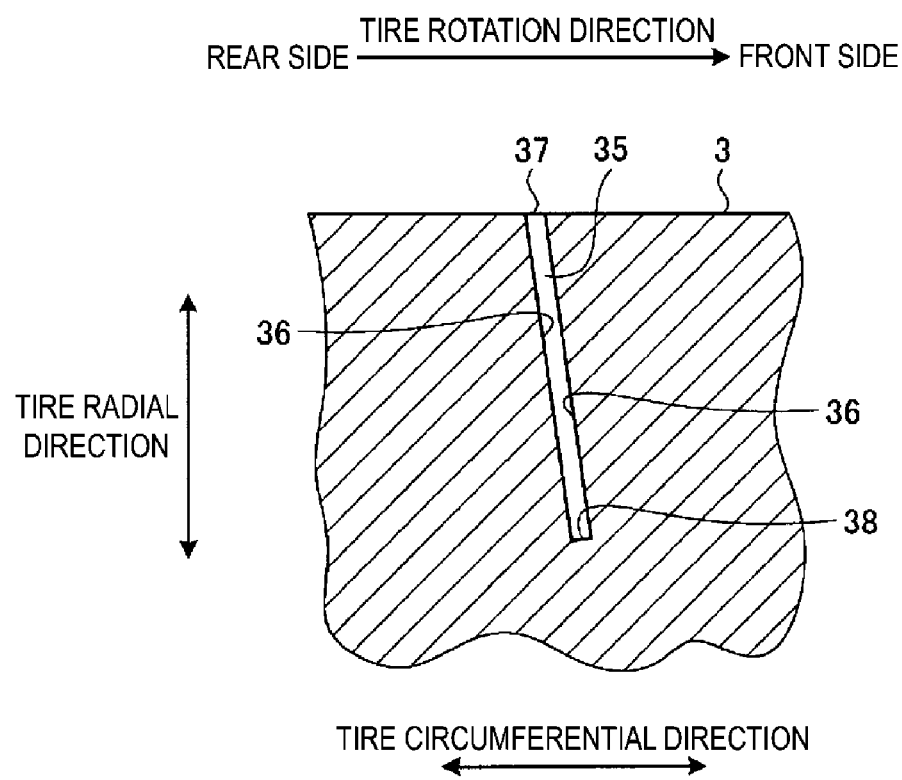
FIG. 6 is a cross-sectional view taken along line F-F of FIG. 3.

FIG. 6 is a cross-sectional view taken along line F-F of FIG. 3. The rib edge sipe 35 includes a wall portion 36 formed inclined from the tire radial direction. The wall portion 36 is inclined in the tire circumferential direction from the tire radial direction such that a bottom 38 thereof is positioned closer to the front side in the tire rotation direction than an opening 37 thereof.

While in the description above, the circumferential sipes 30, the circumferential sipes 35, the first narrow shallow grooves 40, and the second narrow shallow grooves 45 are described using the second rib 22, the center rib 21 similarly includes the circumferential sipes 30, the circumferential sipes 35, the first narrow shallow grooves 40, and the second narrow shallow grooves 45.

The pneumatic tire 1 according to the present embodiment configured as described above is used for a heavy duty pneumatic tire. When the pneumatic tire 1 mounted on a vehicle, the pneumatic tire 1 is mounted on the vehicle while being mounted on a rim wheel and inflated. The pneumatic tire 1 mounted on a rim wheel is mounted on a large vehicle such as a truck or a bus, for example, and is particularly mounted on a front wheel serving as a steering wheel.

When a vehicle mounted with the pneumatic tire 1 travels, the pneumatic tire 1 rotates while a portion of the tread surface 3 positioned on a lower side of the tread surface 3 comes into contact with a road surface. When a vehicle mounted with the pneumatic tire 1 travels on a dry road surface, the vehicle travels by transmitting driving force and braking force to the road surface, and generating turning force, using frictional force between the tread surface 3 and the road surface. When the vehicle travels on a wet road surface, water between the tread surface 3 and the road surface enters the circumferential main grooves 10, and then the vehicle travels while the grooves drain the water between the tread surface 3 and the road surface. Accordingly, the tread surface 3 is prone to come into contact with the road surface, so that the vehicle can travel using frictional force between the tread surface 3 and the road surface.

While a large load acts on the ground contact region in the tread surface 3 during traveling of a vehicle, ground contact pressure of the tread surface 3 due to the load acting on the ground contact region changes in distribution in the ground contact region depending on a traveling state of the vehicle. That is, the ground contact region of the tread surface 3 includes a portion with a large ground contact pressure and a portion with a relatively small ground contact pressure. When the ground contact pressure of the tread surface 3 differs depending on position, uneven wear is likely to occur. In contrast, the pneumatic tire 1 according to the present embodiment is configured such that the circumferential sipes 30, the circumferential sipes 35, the first narrow shallow grooves 40, and the second narrow shallow grooves 45 are provided in the tread surface 3 of the rib 20, and the rib 20 is divided into a plurality of block portions 25. This configuration enables differences in the amount of compression of the rib 20 to be reduced, so that local increase in the ground contact pressure of the tread surface 3 can be suppressed.

That is, when the tread surface 3 comes into contact with the ground and a portion with a high ground contact pressure occurs, the circumferential sipes 30, the circumferential sipes 35, the first narrow shallow grooves 40, and the second narrow shallow grooves 45 flex in accordance with a direction in which the ground contact pressure acts, and then the block portion 25 of the rib 20 can deform in the tire circumferential direction and the tire lateral direction. Accordingly, local increase in the amount of compression of the rib 20 is suppressed, so that ground contact pressure is distributed. Thus, uneven wear caused by local increase in ground contact pressure when the tread surface 3 comes into contact with the ground can be suppressed.

The first narrow shallow groove 40 is formed between the circumferential sipes 30 adjacent to each other in the tire circumferential direction, and the second narrow shallow groove 45 is formed between the first narrow shallow groove 40 and the first narrow shallow groove 45. Thus, wear resistance during initial use of the new pneumatic tire 1, i.e., during initial traveling using it, can be improved. That is, the new pneumatic tire 1 has the tread surface 3 that is not worn off, so that the circumferential main groove 10 has a groove depth deeper than that when the tread surface 3 is worn off. One side of the block portion 25 of the rib 20 is defined by the circumferential main groove 10. Thus, when the rib 20 is divided into a plurality of block portions 25 only by the circumferential sipes 30 and the circumferential sipes 35, each of the block portions 25 of the new pneumatic tire 1 may have insufficient rigidity due to the circumferential main groove 10 having a deep depth. In this case, when the tread surface 3 is in contact with the ground, each of the block portions 25 flexes too much due to ground contact pressure. This may cause uneven wear due to excessive flex of each of the block portions 25.

In contrast, when the first narrow shallow groove 40 is formed between the circumferential sipes 30 adjacent to each other in the tire circumferential direction and the second narrow shallow groove 45 is connected to the first narrow shallow groove 40 to define the corner 26 of the block 25 using the first narrow shallow groove 40 and the second narrow shallow groove 45, excessive flex of the block portion 25 can be suppressed. That is, the first narrow shallow groove 40 and the second narrow shallow groove 45 each have a groove depth shallower than depths of the circumferential sipe 30 and the circumferential sipe 35. Thus, when the corner 26 of the block 25 is defined by the first narrow shallow groove 40 and the second narrow shallow groove 45, a large deformation at or near the corner 26 of the block portion 25 can be suppressed. Accordingly, when the tread surface 3 comes into contact with the ground, excessive flex of the block portion 25 due to ground contact pressure can be suppressed. Thus, uneven wear caused by excessive flex of the block portion 25 during initial traveling can be suppressed. This enables suppressing a situation in which the pneumatic tire 1 is removed from the vehicle in an early stage due to uneven wear during initial traveling, so that decrease in travel distance allowing the pneumatic tire 1 to be continuously used can be suppressed. Additionally, uneven wear during initial traveling can be suppressed, so that uneven wear of subsequent traveling caused by the uneven wear during initial traveling can be suppressed. As a result, uneven wear resistance can be improved to enable extending wear life being life due to wear.

In addition, the second narrow shallow grooves 45 disposed on respective sides in the tire lateral direction across the first narrow shallow groove 40 have the respective inner connection portions 45a that are displaced from each other in the tire circumferential direction, so that the ground contact pressure can be more reliably distributed to enable suppressing uneven wear. That is, while the ground contact pressure on the tread surface 3 during contact with the ground is likely to be concentrated at a position where edges of a groove and a sipe intersect each other, the inner connection portions 45a of the respective two second narrow shallow grooves 45 connected to the same first narrow shallow groove 40 are relatively displaced in the tire circumferential direction to enable the corner 26 of each of the two block portions 25 positioned on respective sides in the tire lateral direction across the first narrow shallow groove 40 to be displaced in the tire circumferential direction. Accordingly, the corner 26 of the block portion 25, allowing ground contact pressure to be likely to be concentrated, is prevented from being concentrated in a narrow range to enable distributing the corner 26, so that uneven wear caused by concentration of ground contact pressure in a narrow range can be suppressed. This enables suppressing a situation in which the pneumatic tire 1 is removed from the vehicle in an early stage due to uneven wear during initial traveling, so that decrease in travel distance allowing the pneumatic tire 1 to be continuously used can be suppressed. Additionally, uneven wear during initial traveling can be suppressed, so that uneven wear of subsequent traveling caused by the uneven wear during initial traveling can be suppressed. As a result, uneven wear resistance can be improved to enable extending wear life being life due to wear.

The relationship between the offset amount $L_{N2}$ between the inner connection portions 45a of the second narrow shallow grooves 45 and the distance $L_{SE}$ in the tire circumferential direction between the opening end portions 35b of the respective rib edge sipes 35 adjacent to each other in the tire circumferential direction is in the range $0.5 \leq (L_{N2}/L_{SE}) \leq 2.0$, so that ground contact pressure can be effectively distributed while occurrence of rubber chips at or near the rib edge 20a is suppressed. That is, when the relationship between the offset amount $L_{N2}$ between the inner connection portions 45a and the distance $L_{SE}$ in the tire circumferential direction between the opening end portions 35b of the respective rib edge sipes 35 is in the range $(L_{N2}/L_{SE}) < 0.5$, the offset amount $L_{N2}$ between the inner connection portions 45a is too small. Thus, the corners 26 of the block 25 are difficult to be distributed, so that the ground contact pressure may be difficult to be effectively distributed. When the relationship between the offset amount $L_{N2}$ between the inner connection portions 45a and the distance $L_{SE}$ in the tire circumferential direction between the opening end portions 35b of the respective rib edge sipes 35 is in the range $(L_{N2}/L_{SE}) > 2.0$, an interval between the rib edge sipes 35 may be too small. In this case, the too-mall interval between the rib edge sipes 35 may cause chips of rubber constituting the rib 20 to occur between the rib edge sipes 35.

In contrast, when the relationship between the offset amount $L_{N2}$ between the inner connection portions 45a and the distance $L_{SE}$ in the tire circumferential direction between the opening end portions 35b of the respective rib edge sipes 35 is in the range $0.5 \leq (L_{N2}/L_{SE}) \leq 2$, ground contact pressure can be effectively distributed by distributing the corner 26 of the block portion 25 while chips of rubber between the rib edge sipes 35 are suppressed. As a result, uneven wear resistance can be more reliably improved to increase wear life while rubber chips at or near the rib edge 20a are suppressed.

In addition, the relationship between the offset amount $L_{N2}$ between the inner connection portions 45a of the second narrow shallow grooves 45 and the length $L_{SC}$ of the circumferential sipe 30 in the tire circumferential direction is in the range $0.1 \leq (L_{N2}/L_{SC}) \leq 0.6$, so that the ground contact pressure can be more reliably and effectively distributed. That is, when the relationship between the offset amount $L_{N2}$ between the inner connection portions 45a and the length $L_{SC}$ of the circumferential sipe 30 in the tire circumferential direction is in the range $(L_{N2}/L_{SC}) < 0.1$, the offset amount $L_{N2}$ between the inner connection portions 45a is too small. Thus, the corners 26 of the block 25 are difficult to be distributed, so that the ground contact pressure may be difficult to be effectively distributed. When the relationship between the offset amount $L_{N2}$ between the inner connection portions 45a and the length $L_{SC}$ of the circumferential sipe 30 in the tire circumferential direction is in the range $(L_{N2}/L_{SC}) > 0.6$, the length $L_{SC}$ of the circumferential sipe 30 in the tire circumferential direction may be too short. In this case, the block portion 25 is less likely to deform, so that the ground contact pressure is difficult to be distributed. Thus, uneven wear caused by local increase in ground contact pressure may be difficult to be effectively suppressed.

In contrast, when the relationship between the offset amount $L_{N2}$ between the inner connection portions 45a and the length $L_{SC}$ of the circumferential sipe 30 in the tire circumferential direction is in the range $0.1 \leq (L_{N2}/L_{SC}) \leq 0.6$, the corners 26 of the block portion 25 are more reliably distributed and the block portion 25 is ensured to be more reliably and easily deform, and thus ground contact pressure can be effectively distributed. As a result, uneven wear resistance can be more reliably improved to extend wear life.

The second narrow shallow groove 45 has the relationship between the offset amount $L_{N2}$ between the inner connection portions 45a and the length $L_B$ of the block portion 25 in the tire circumferential direction, being in the range $0.1 \leq (L_{N2}/L_B) \leq 0.4$, so that ground contact pressure can be more reliably distributed. That is, when the relationship between the offset amount $L_{N2}$ between the inner connection portions 45a and the length $L_B$ of the block 25 in the tire circumferential direction is in the range $(L_{N2}/L_B) < 0.1$, the offset amount $L_{N2}$ between the inner connection portions 45a is too small. Thus, the corners 26 of the block 25 are difficult to be distributed, so that the ground contact pressure may be difficult to be effectively distributed. When the relationship between the offset amount $L_{N2}$ between the inner connection portions 45a and the length $L_B$ of the block portion 25 in the tire circumferential direction is in the range $(L_{N2}/L_B) > 0.4$, the length $L_{SC}$ of the circumferential sipe 30 in the tire circumferential direction may be too short. That is, in the present embodiment, the offset amount $L_{N2}$ between the inner connection portions 45a is the offset amount $L_{N2}$ between the inner connection portions 45a of the two second narrow shallow grooves 45 connected to the same first narrow shallow groove 40. Thus, when the offset amount $L_{N2}$ is in the range $(L_{N2}/L_B)>0.44$, the length $L_{N1}$ of the first narrow shallow groove 40 in the tire circumferential direction is substantially relatively long, i.e., the length $L_{SC}$ of the circumferential sipe 30 in the tire circumferential direction is relatively short. In this case, the length $L_{SC}$ of the circumferential sipe 30 in the tire circumferential direction may be too short with respect to the length $L_B$ of the block 25 in the tire circumferential direction, so that the effect of suppressing local increase in ground contact pressure and suppressing uneven wear due to deformation of the block portion 25 may be reduced.

In contrast, when the relationship between the offset amount $L_{N2}$ between the inner connection portions 45a and the length $L_B$ of the block portion 25 in the tire circumferential direction is in the range $0.1 \leq (L_{N2}/L_B) \leq 0.4$, the corners 26 of the block portion 25 are more reliably distributed and the block portion 25 is ensured to be more reliably and easily deform, and thus ground contact pressure can be effectively distributed. As a result, uneven wear resistance can be more reliably improved to extend wear life.

In addition, the first narrow shallow groove 40 has a maximum groove depth $D_{N1}$ in the range 0.5 mm $\leq D_{N1} \leq 4.0$ mm, so that the first narrow shallow groove 40 can more reliably suppress flex of the block portion 25 and can maintain effect of distributing ground contact pressure for a predetermined period of time. That is, when the maximum groove depth $D_{N1}$ of the first narrow shallow groove 40 is in the range $D_{N1}<0.5$ mm, the maximum groove depth $D_{N1}$ of the first narrow shallow groove 40 is too shallow. Thus, wear of the tread surface 3 may cause the first narrow shallow groove 40 to prematurely disappear. In this case, the effect of distributing the ground contact pressure using the first narrow shallow groove 40 disappears at an early stage during initial traveling, so that uneven wear during initial traveling may be difficult to be effectively suppressed. When the maximum groove depth $D_{N1}$ of the first narrow shallow groove 40 is in the range $D_{N1}>4.0$ mm, the maximum groove depth $D_{N1}$ of the first narrow shallow groove 40 is too deep. Thus, effectively suppressing flex of the block portion 25 is difficult, so that suppressing uneven wear caused by excessive flex of the block 25 may be difficult.

In contrast, when the maximum groove depth $D_{N1}$ of the first narrow shallow groove 40 is in the range 0.5 mm $\leq D_{N1} \leq 4.0$ mm, the first narrow shallow groove 40 can effectively suppress flex of the block portion 25 and can maintain effect of distributing ground contact pressure for a predetermined travel distance after using the new pneumatic tire 1 starts. For example, when wear of the tread surface 3 develops after using the new pneumatic tire 1 is started, the groove depth of the circumferential main groove 10 decreases. Thus, the first narrow shallow groove 40 can maintain effect of distributing ground contact pressure until a level of flex of the block portion 25 decreases such that uneven wear due to flex of the block portion 25 is less likely to occur. As a result, uneven wear resistance can be more reliably improved.

In addition, the second narrow shallow groove 45 has a maximum groove depth $D_{N2}$ in the range 0.5 mm $\leq D_{N2} \leq 4.0$ mm, so that the second narrow shallow groove 45 can more reliably suppress flex of the block portion 25 and can maintain effect of distributing ground contact pressure for a predetermined period of time. That is, when the maximum groove depth $D_{N2}$ of the second narrow shallow groove 45 is in the range $D_{N2}<0.5$ mm, the maximum groove depth $D_{N2}$ of the second narrow shallow groove 45 is too shallow. Thus, wear of the tread surface 3 may cause the second narrow shallow groove 45 to prematurely disappear. In this case, the effect of distributing the ground contact pressure using the second narrow shallow groove 45 disappears at an early stage during initial traveling, so that uneven wear during initial traveling may be difficult to be effectively suppressed. When the maximum groove depth $D_{N2}$ of the second narrow shallow groove 45 is in the range $D_{N2}>4.0$ mm, the maximum groove depth $D_{N2}$ of the second narrow shallow groove 45 is too deep. Thus, effectively suppressing flex of the block portion 25 is difficult, so that suppressing uneven wear caused by excessive flex of the block 25 may be difficult.

In contrast, when the maximum groove depth $D_{N2}$ of the second narrow shallow groove 45 is in the range 0.5 mm $\leq D_{N2} \leq 4.0$ mm, the second narrow shallow groove 45 can effectively suppress flex of the block portion 25 and can maintain effect of distributing ground contact pressure for a predetermined travel distance after using the new pneumatic tire 1 starts. For example, when wear of the tread surface 3 develops after using the new pneumatic tire 1 is started, the groove depth of the circumferential main groove 10 decreases. Thus, the second narrow shallow groove 45 can maintain effect of distributing ground contact pressure until a level of flex of the block portion 25 decreases such that uneven wear due to flex of the block portion 25 is less likely to occur. As a result, uneven wear resistance can be more reliably improved.

The circumferential sipe 30 has a relationship between the maximum depth $D_{SC}$ of the circumferential sipe 30 and the maximum groove depth D of the circumferential main groove 10, being in the range $0.50 \leq (D_{SC}/D) \leq 0.80$, so that the block portion 25 can be appropriately deformed to distribute ground pressure to an terminal states of wear of the tread surface 3, and uneven wear can be suppressed. That is, when the relationship between the maximum depth $D_{SC}$ of the circumferential sipe 30 and the maximum groove depth D of the circumferential main groove 10 is in the range $(D_{SC}/D)<0.50$, the maximum depth $D_{SC}$ of the circumferential sipe 30 is too shallow, so that the circumferential sipe 30 does not remain until the terminal states of wear of the tread surface 3, and the circumferential sipe 30 may disappear during the course of wear. In this case, the effect of distributing the ground pressure using the circumferential sipe 30 does not continue to the terminal states of wear, so that effectively suppressing uneven wear of the tread surface 3 until the terminal states of wear may be difficult. When the relationship between the maximum depth $D_{SC}$ of the circumferential sipe 30 and the maximum groove depth D of the circumferential main groove 10 is in the range $(D_{SC}/D)>0.80$, the maximum depth $D_{SC}$ of the circumferential sipe 30 is too deep. Thus, the amount of deformation of the block portion 25 when the tread surface 3 comes into contact with the ground may be too large. In this case, flex of the block portion 25 due to deformation of the block portion 25 is too large, so that suppressing uneven wear may be difficult.

In contrast, when the relationship between the maximum depth $D_{SC}$ of the circumferential sipe 30 and the maximum groove depth D of the circumferential main groove 10 is in the range $0.50 \leq (D_{SC}/D) \leq 0.80$, the circumferential sipe 30 allows the block 25 to deform to the end state of wear such that the block portion 25 does not flex excessively. Accordingly, the ground contact pressure of the tread surface 3 can be distributed even after initial stages of wear of the tread surface 3, so that uneven wear can be suppressed until the end state of wear. As a result, uneven wear resistance can be more reliably improved.

The rib edge sipe 35 has a relationship between the maximum depth $D_{SE}$ of the rib edge sipe 35 and the maximum groove depth D of the circumferential main groove 10, being in the range $0.60 \le (D_{SE}/D) \le 0.90$, so that the block portion 25 can be appropriately deformed to distribute ground pressure to the terminal states of wear of the tread surface 3, and uneven wear can be suppressed. That is, when the relationship between the maximum depth $D_{SE}$ of the rib edge sipe 35 and the maximum groove depth D of the circumferential main groove 10 is in the range $(D_{SE}/D)<0.60$, the maximum depth $D_{SE}$ of the rib edge sipe 35 is too shallow. Thus, the rib edge sipe 35 does not remain until the terminal states of wear of the tread surface 3, and the rib edge sipe 35 may disappear during the course of wear. In this case, the effect of distributing the ground pressure using the rib edge sipe 35 does not continue to the terminal stages of wear, so that effectively suppressing uneven wear of the tread surface 3 until the terminal stages of wear may be difficult. When the relationship between the maximum depth $D_{SE}$ of the leg cuffs 35 and the maximum groove depth D of the circumferential main groove 10 is in the range $(D_{SE}/D)>0.90$, the maximum depth $D_{SE}$ of the leg cuffs 35 is too deep. Thus, the amount of deformation of the block portion 25 when the tread surface 3 comes into contact with the ground may be too large. In this case, flex of the block portion 25 due to deformation of the block portion 25 is too large, so that suppressing uneven wear may be difficult.

In contrast, when the relationship between the maximum depth $D_{SE}$ of the rib edge sipe 35 and the maximum groove depth D of the circumferential main groove 10 is in the range $0.60 \le (D_{SE}/D) \le 0.90$, the rib edge sipe 35 allows the block 25 to deform to the end state of wear such that the block portion 25 does not flex excessively. Accordingly, the ground contact pressure of the tread surface 3 can be distributed even after initial stages of wear of the tread surface 3, so that uneven wear can be suppressed until the end state of wear. As a result, uneven wear resistance can be more reliably improved.

The second narrow shallow groove 45 is inclined from the tire lateral direction from the front side in the tire rotation direction toward the rear side in the tire rotation direction, from the inner connection portion 45a side toward the outer connection portion 45b, so that the corner 26 on a first narrow shallow groove 40 side on a trailing side in the block portion 25 can be set to an obtuse angle. That is, the second narrow shallow groove 45 has a portion on the rear side in the tire rotation direction that forms an acute angle α from the tire circumferential direction, so that the second narrow shallow groove 45 has a portion on the front side in the tire rotation direction that can form an obtuse angle from the tire circumferential direction, i.e., the corner 26 on the trailing side in the block portion 25 can be set to an obtuse angle. Accordingly, a side of the block portion 25 on the trailing side gradually separates from a road surface, from the corner 26 toward the circumferential main groove 10, so that locally increased ground contact pressure caused by a portion at or near the corner 26, being in contact with the road surface until the end, can be prevented in each block portion 25. Thus, excessively high ground contact pressure at or near the corner 26 on the trailing side of the block portion 25 during initial traveling can be suppressed to prevent uneven wear from being likely to occur, so that uneven wear resistance during initial traveling can be more reliably improved. As a result, uneven wear resistance can be more reliably improved to extend wear life.

The rib edge sipe 35 is inclined from the tire lateral direction from the front side in the tire rotation direction toward the rear side in the tire rotation direction, from the terminating end portion 35a toward the opening end portion 35b, so that ground contact pressure at or near the rib edge 20a of the rib 20 can be effectively distributed. That is, when a portion at or near the rib edge sipe 35, defining the rear side in the tire rotation direction in the block portion 25 on the front side in the tire rotation direction of the two block portions 25 aligning in the tire rotation direction, comes into contact with the ground, the block portion 25 on the front side in the tire rotation direction deforms and then is supported by the block portion 25 on the rear side in the tire rotation direction. Thus ground contact pressure is distributed. At this time, the ground contact pressure at or near the rib edge 20a is likely to increase. Thus, when the rib edge sipe 35 is inclined in a direction allowing a portion of the rib edge sipe 35 on the rear side in the tire rotation direction to form an acute angle β from the tire circumferential direction, the ground contact pressure at or near the rib edge 20a, where the ground contact pressure is likely to increase, can be more reliably distributed by the block portions 25 adjacent to each other in the tire rotation direction. As a result, uneven wear caused by local increase in ground contact pressure can be more reliably suppressed, and uneven wear resistance can be more reliably improved.

The circumferential sipe 30 and the first narrow shallow groove 40 have a relationship between the length $L_{SC}$ in the tire circumferential direction of the circumferential sipe 30 and the length $L_{N1}$ of the first narrow shallow groove 40 in the tire circumferential direction, being in the range $0.4 \le (L_{N1}/L_{SC}) \le 0.8$, so that ground contact pressure of the tread surface 3 can be distributed while excessive flex of the block portion 25 during initial traveling is suppressed. That is, when the relationship between the length $L_{SC}$ of the circumferential sipe 30 and the length $L_{N1}$ of the first narrow shallow groove 40 in the tire circumferential direction is in the range $(L_{N1}/L_{SC})<0.4$, the first narrow shallow groove 40 is too short with respect to the circumferential sipe 30. Thus, during initial traveling of the pneumatic tire 1, excessive flex of the block portion 25 due to ground contact pressure may be difficult to be effectively suppressed. In this case, effectively suppressing uneven wear caused by excessive flex of the block portion 25 during initial traveling may be difficult. When the relationship between the length $L_{SC}$ of the circumferential sipe 30 in the tire circumferential direction and the length $L_{N1}$ of the first narrow shallow groove 40 in the tire circumferential direction is in the range $(L_{N1}/L_{SC})>0.8$, the first narrow shallow groove 40 is too long with respect to the circumferential sipe 30, i.e., the circumferential sipe 30 is too short. Thus, the block portion 25 may be less likely to deform. In this case, even when the tread surface 3 has a portion with ground contact pressure locally increased at the time of coming into contact with the ground, effectively distributing the ground contact pressure may be difficult. Thus, suppressing uneven wear may be difficult.

In contrast, when the relationship between the length $L_{SC}$ of the circumferential sipe 30 and the length $L_{N1}$ of the first narrow shallow groove 40 in the tire circumferential direction is in the range $0.4 \le (L_{N1}/L_{SC}) \le 0.8$, the ground contact pressure of the tread surface 3 can be distributed more reliably while excessive flex of the block portion 25 during initial traveling is suppressed. As a result, uneven wear resistance can be more reliably improved.

The rib edge sipe 35 is inclined from the tire radial direction in a direction, in which the rib edge sipe 35 is positioned on the front side in in the tire rotation direction, from the opening 37 to the bottom 38. Thus, when the block 25 positioned on the front side in the tire rotation direction of rib edge sipe 35 deforms, the block 25 can be more reliably supported by the block portion 25 positioned on the rear side in the tire rotation direction of the rib edge sipe 35. That is, when the block portion 25 deforms, the block portion 25 close to the tread surface 3 first deforms.

Thus, when the block portion 25 positioned on the front side in the tire rotation direction deforms, the block portion 25 positioned on the rear side in the tire rotation direction receives force from the block portion 25 positioned on the front side in the tire rotation direction, the force being applied in a direction having an angle close to an angle orthogonal to the wall portion 36 of the rib edge sipe 35 inclined from the tire radial direction. Accordingly, the block portion 25 positioned on the rear side in the tire rotation direction can support the block portion 25 positioned on the front side in the tire rotation direction more efficiently, and the ground contact pressure when the tread surface 3 comes into contact with the ground can be more reliably distributed between the block portions 25 adjacent to each other in the tire rotation direction. As a result, uneven wear resistance can be more reliably improved.

In addition, a plurality of the rib edge sipes 35 are formed aligning in the tire circumferential direction, at and near the rib edge 20a of the rib 20, so that ground contact pressure at a position where the ground contact pressure is likely to increase can be reliably distributed. That is, there is no ground contact surface at a position where the circumferential main groove 10 is formed, accordingly, ground contact pressure is likely to increase at or near the rib edge 20a of the rib 20 positioned on each side across the circumferential main groove 10. The plurality of the rib edge sipes 35 are disposed near the rib edge 20a at which ground contact pressure is likely to increase. Thus, when the ground contact pressure at or near the connector insert 20 locally increases, the rib edge sipe 35 collapses at its portion with high ground contact pressure and the rib 20 deforms in the tire circumferential direction. Then, local increase in the amount of compression of the rib 20 can be suppressed. Accordingly, the ground contact pressure can be distributed, so that uneven wear caused by local increase in ground contact pressure can be suppressed. As a result, uneven wear resistance can be more reliably improved.

The circumferential sipe 30 extends in the tire circumferential direction while bending, so that an overall length of the circumferential sipe 30 can be increased compared to when the circumferential sipes 30 extends linearly. Accordingly, the amount of compression of the block portion 25 when the tread surface 3 comes into contact with the ground can be more reliably reduced, and the ground contact pressure can be more reliably distributed. As a result, uneven wear resistance can be more reliably improved.

The second narrow shallow groove 45 includes the orthogonal portion 47 formed at approximately 90° from the first narrow shallow groove 40, and the orthogonal portion 47 is connected to the first narrow shallow groove 40. Thus, even when the second narrow shallow groove 45 and the first narrow shallow groove 40 are connected at an angle other than 90°, the second narrow shallow groove 45 can be connected to the first narrow shallow groove 40 in a substantially orthogonal form. Accordingly, the corner 26 of the block portion 25 can be prevented from being formed at an acute angle. That is, when the corner 26 of the block portion 25 is formed at an acute angle, the corner 26 may be chipped. In contrast, when the second narrow shallow groove 45 is connected to the first narrow shallow groove 40 in a substantially orthogonal form, the corner 26 of the block portion 25 can be prevented from being formed at an acute angle and can be prevented from chipping. As a result, uneven wear resistance can be improved, and chipping of the block portion 25 formed in the rib 20 can be suppressed.

Figure 7:
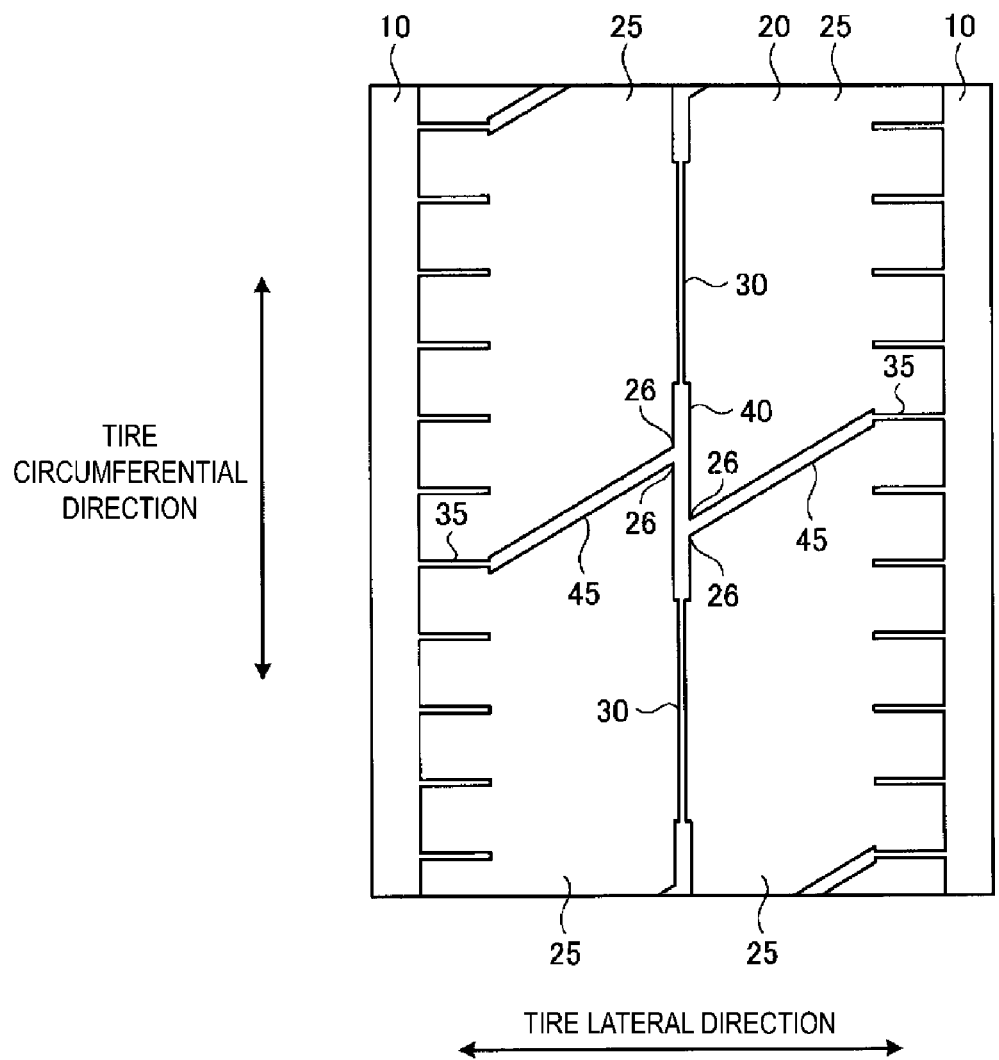
FIG. 7 is an explanatory diagram of a modified example of the pneumatic tire according to the embodiment, illustrating a state in which a circumferential sipe is formed linearly.

The circumferential sipe 30, the circumferential sipe 35, the first narrow shallow groove 40, and the second narrow shallow groove 45 each may have a shape other than that of the pneumatic tire 1 according to the embodiment described above. FIG. 7 is an explanatory diagram of a modified example of the pneumatic tire 1 according to the embodiment, illustrating a state in which a circumferential sipe 30 is formed linearly. While in the embodiment described above, the circumferential sipe 30 is formed by bending in the tire lateral direction while extending in the tire circumferential direction, the circumferential sipe 30 may be formed in a linear shape along the tire circumferential direction as illustrated in FIG. 7, for example.

Figure 8:
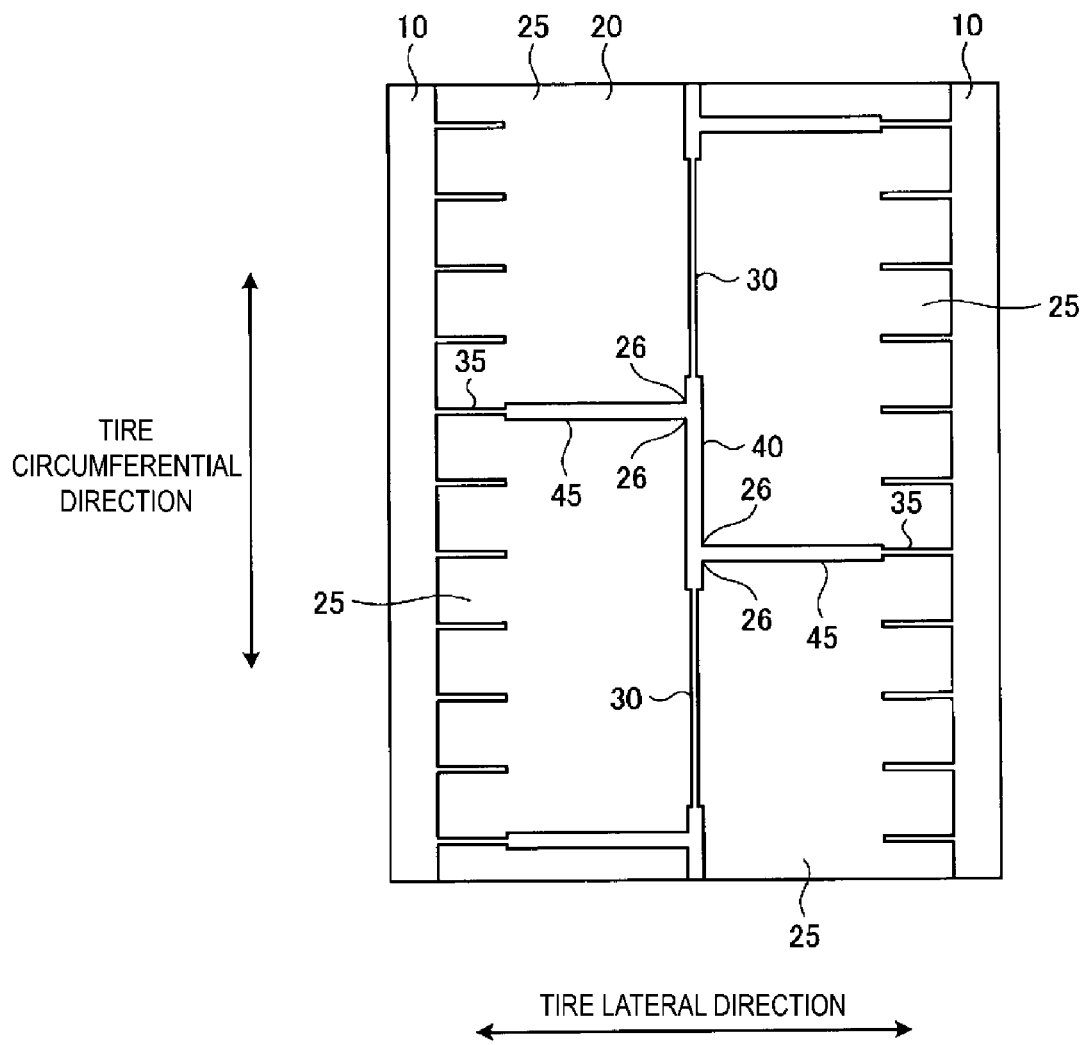
FIG. 8 is an explanatory diagram of a modified example of the pneumatic tire according to the embodiment, illustrating a state in which a rib edge sipe and a second narrow shallow groove are formed along a tire lateral direction.

FIG. 8 is an explanatory diagram of a modified example of the pneumatic tire 1 according to the embodiment, illustrating a state in which a rib edge sipe 35 and a second narrow shallow groove 45 are formed along a tire lateral direction. While in the embodiment described above, the rib edge sipe 35 and the second narrow shallow groove 45 are formed inclined in the tire circumferential direction while extending in the tire lateral direction, the second narrow shallow groove 45 may be formed in a linear shape along the tire lateral direction, as illustrated in FIG. 8.

Figure 9:
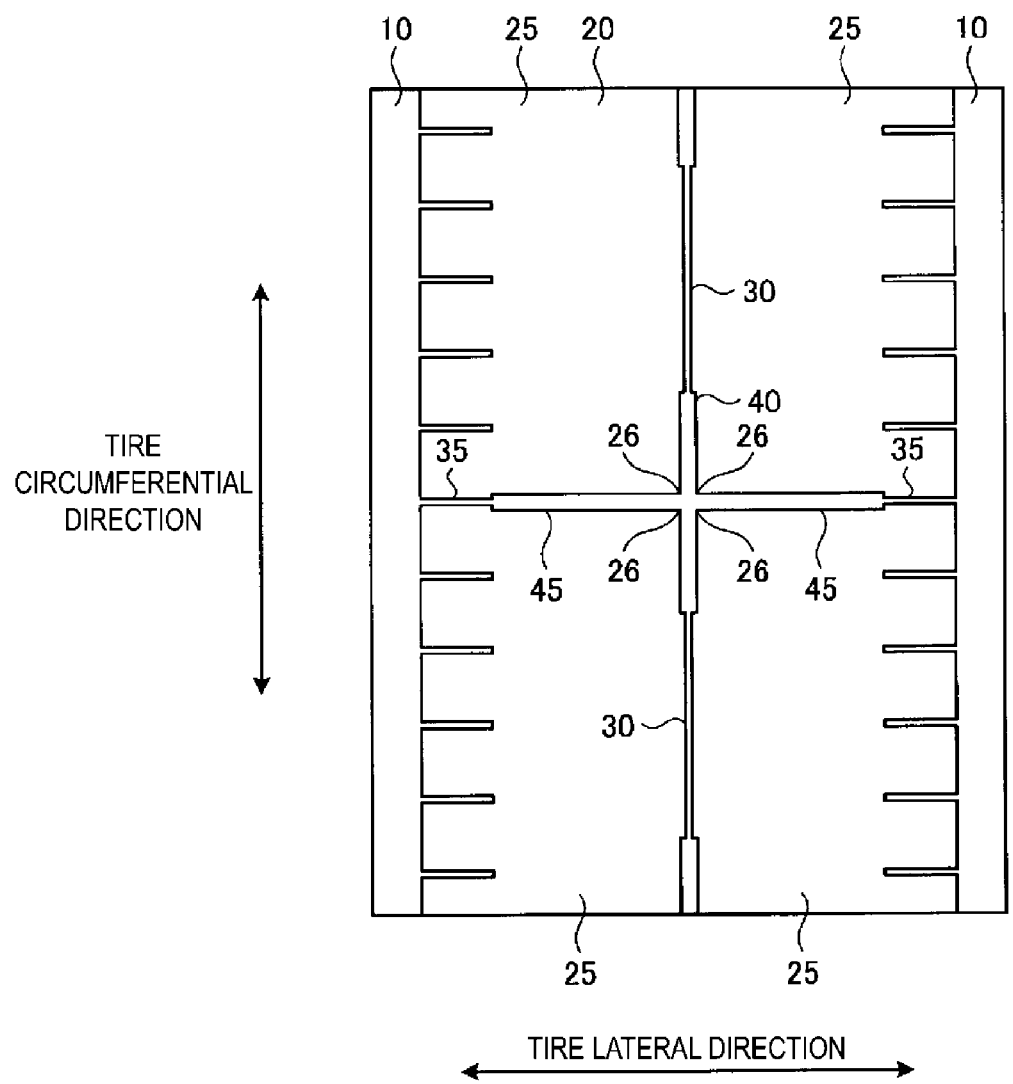
FIG. 9 is an explanatory diagram of a modified example of the pneumatic tire according to the embodiment, illustrating a state in which two second narrow shallow grooves connected to a first narrow shallow groove are disposed at the same position in a tire circumferential direction.

FIG. 9 is an explanatory diagram of a modified example of the pneumatic tire 1 according to the embodiment, illustrating a state in which two second narrow shallow grooves 45 connected to a first narrow shallow groove 40 are disposed at the same position in a tire circumferential direction. While in the embodiment described above, the two second narrow shallow grooves 45 connected to the same first narrow shallow groove 40 are connected to the respective first narrow shallow grooves 40 at different positions in the tire circumferential direction, the two second narrow shallow grooves 45 may be connected to the respective first narrow shallow grooves 40 at the same position in the tire circumferential direction, as illustrated in FIG. 9.

Figure 10:
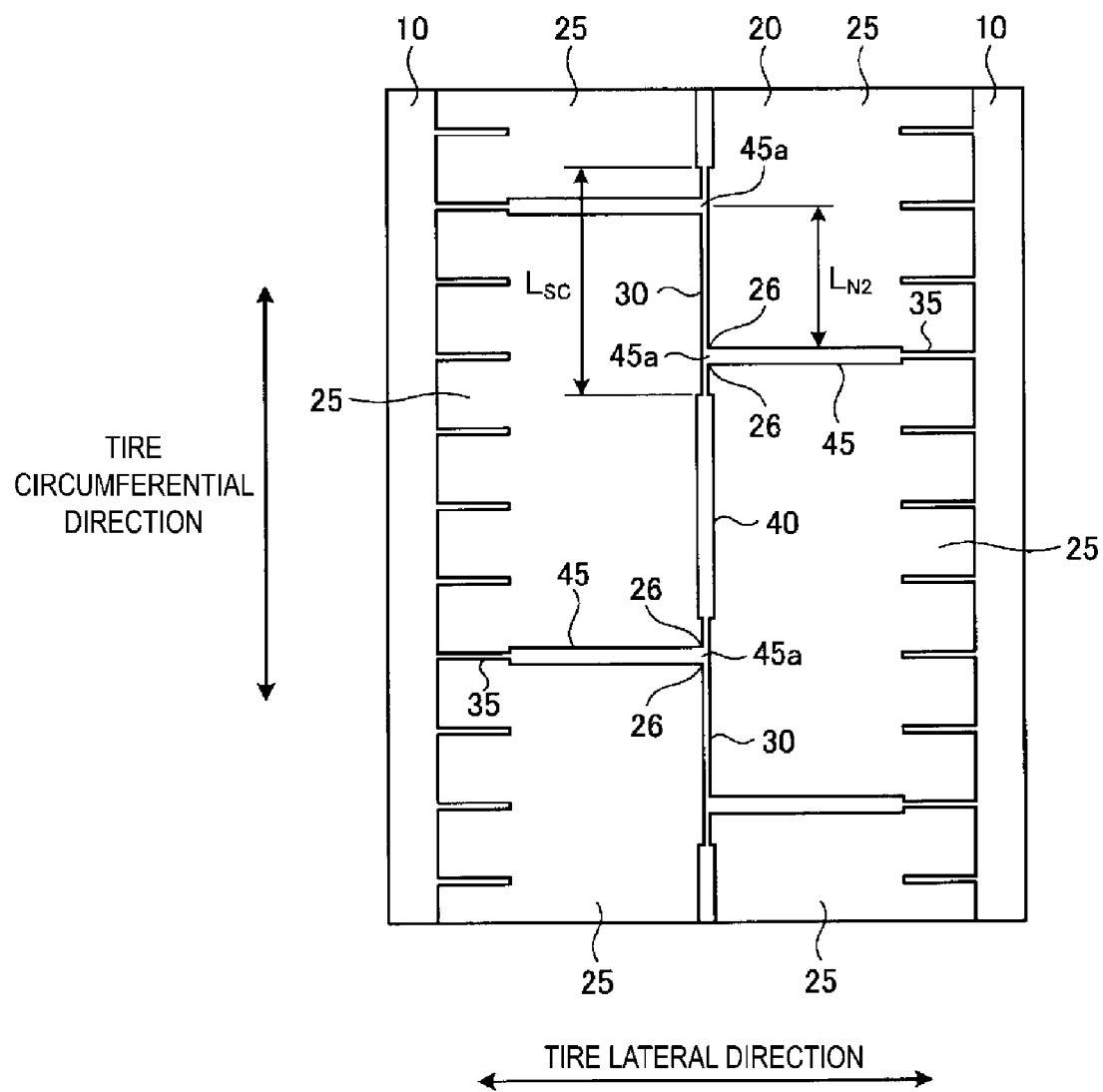
FIG. 10 is an explanatory diagram of a modified example of the pneumatic tire according to the embodiment, illustrating a state in which a second narrow shallow groove are connected to a circumferential sipe.

FIG. 10 is an explanatory diagram of a modified example of the pneumatic tire 1 according to the embodiment, illustrating a state in which a second narrow shallow groove 45 is connected to a circumferential sipe 30. While in the embodiment described above, the inner connection portion 45a of the second narrow shallow groove 45 is connected to the first narrow shallow groove 40, the inner connection portion 45a of the second narrow shallow groove 45 may be connected to the circumferential sipe 30, as illustrated in FIG. 10. That is, the second narrow shallow groove 45 may be connected to the circumferential sipe 30 and disposed on each side across the circumferential sipe 30 in the tire lateral direction. A plurality of the second narrow shallow grooves 45 may be connected at their inner connection portions 45a to any one of the first narrow shallow groove 40 and the circumferential sipe 30 as far as the inner connection portions 45a of the respective second narrow shallow grooves 45 disposed respective sides across the first narrow shallow groove 40 or the circumferential sipe 30 in the tire lateral direction are positioned displaced from each other in the tire circumferential direction.

When the inner connection portion 45a of the second narrow shallow groove 45 is connected to the circumferential sipe 30, a corner 26 of a block 25 is defined by the second narrow shallow groove 45 and the circumferential sipe 30. However, when the second narrow shallow grooves 45 positioned on respective sides across the circumferential sipe 30 in the tire lateral direction have the respective inner connection portions 45a displaced from each other in the tire circumferential direction, block portions 25 positioned on respective sides across the circumferential sipe 30 in the tire lateral direction can have respective corners 26 displaced from each other in the tire circumferential direction. Accordingly, ground contact pressure can be distributed, so that uneven wear caused by concentration of ground contact pressure in a narrow range can be suppressed.

The plurality of the second narrow shallow grooves 45 may include some second narrow shallow grooves 45 each having the inner connection portion 45a connected to the first narrow shallow groove 40, and the other second narrow shallow grooves 45 each having the inner connection portion 45a connected to the circumferential sipe 30. When the inner connection portions 45a of the respective second narrow shallow grooves 45 are connected to the circumferential sipe 30, the offset amount $L_{N2}$ in the tire circumferential direction between the inner connection portions 45a and the length $L_{SC}$ of the circumferential sipe 30 in the tire circumferential direction are calculated, each having at least a range overlapping each other in the tire circumferential direction. For example, as illustrated in FIG. 10, when any inner connection portions 45a connected to the corresponding circumferential sipes 30 include the inner connection portions 45a having a closest distance in the tire circumferential direction, being the two inner connection portions 45a connected to the same circumferential sipe 30, the offset amount $L_{N2}$ between the two inner connection portions 45a is calculated having a range in the tire circumferential direction, within a range of the length $L_{SC}$ of the circumferential sipe 30 in the tire circumferential direction.

While in the embodiment described above, the groove width $W_{N1}$ of the first narrow shallow groove 40 and the groove width $W_{N2}$ of the second narrow shallow groove 45 are substantially the same size, and the maximum groove depth $D_{N1}$ of the first narrow shallow groove 40 and the maximum groove depth $D_{N2}$ of the second narrow shallow groove 45 are also substantially the same size, these may be different from each other. For example, the maximum groove depth $D_{N1}$ of the first narrow shallow groove 40 may be more than the maximum groove depth $D_{N2}$ of the second narrow shallow groove 45. That is, the second narrow shallow groove 45 extends in a direction approximately parallel to the tire lateral direction, so that a groove width direction is approximately parallel to the tire circumferential direction. Thus, when the groove depth of the second narrow shallow groove 45 is deeper than the groove depth of the first narrow shallow groove 40, the block portions 25 positioned on respective sides across the second narrow shallow groove 45 in the groove width direction are easily displaced in a direction in which the groove width of the second narrow shallow groove 45 changes when the pneumatic tire 1 is rotated, i.e., the block portion 25 easily flexes in the tire circumferential direction. In this case, so-called heel-toe wear is likely to occur, the heel-toe wear being uneven wear in which an end portion of the block portion 25 on the rear side in the tire rotation direction is worn more than an end portion thereof on the front side in the tire rotation direction. In contrast, when the groove depth of the first narrow shallow groove 40 is deeper than the groove depth of the second narrow shallow groove 45, this kind of uneven wear is less likely to occur. Thus, when the first narrow shallow groove 40 and the second narrow shallow groove 45 are made different in groove depth, the maximum groove depth $D_{N1}$ of the first narrow shallow groove 40 is preferably more than the maximum groove depth $D_{N2}$ of the second narrow shallow groove 45.

As described above, as far as the corner 26 of the block portion 25 can be defined by the first narrow shallow groove 40 and the second narrow shallow groove 45 by dividing the rib 20 into a plurality of the block portions 25 using the circumferential sipe 30 and the first narrow shallow groove 40 that are formed generally toward the tire circumferential direction, and the circumferential sipe 35 and the second narrow shallow groove 45 that are formed generally toward the tire lateral direction, specific shapes of the circumferential sipe 30, the narrow shallow groove 35, the first narrow shallow groove 40, and the second narrow shallow groove 45 do not matter. Alternatively, as far as the corners 26 of the respective block portions 25 each defined by the circumferential sipe 30 and the second narrow shallow groove 45, or by the circumferential sipe 30 and the second narrow shallow groove 4, can be displaced from each other in the tire circumferential direction by dividing the rib 20 is divided into a plurality of the block portions 25 using the circumferential sipe 30 and the first narrow shallow groove 40 that are formed generally toward the tire circumferential direction, and the circumferential sipe 35 and the second narrow shallow groove 45 that are formed generally toward the tire lateral direction, specific shapes of the circumferential sipe 30, the narrow shallow groove 35, the first narrow shallow groove 40, and the second narrow shallow groove 45 do not matter.

While in the embodiment described above, a plurality of the rib edge sipes 35 that are not connected to the second narrow shallow grooves 45 is provided between the rib edge sipes 35 that are connected to the respective second narrow shallow grooves 45, the rib edge sipes 35 other than the rib edge sipes 35 connected to the second narrow shallow groove 45 may not be provided. As far as the rib edge sipes 35 include at least the rib edge sipes 35 that can define the block portion 25 by being connected to the second narrow shallow groove 45, another rib edge sipe 35 may be, or may not be provided.

While in the embodiment described above, the circumferential sipe 30, the first narrow shallow groove 40, and the second narrow shallow groove 45 are all formed in the same respective forms in the center rib 21 and the second rib 22, these may be formed in different forms for each rib 20. While the pneumatic tire 1 according to the embodiment described above is the pneumatic tire 1 with a designated tire rotation direction, the pneumatic tire 1 including the rib 20 divided into a plurality of block portions 25 by the circumferential sipe 30, the rib edge sipe 35, the first narrow shallow groove 40, and the second narrow shallow groove 45 may not have designation of tire rotation direction.

While in the embodiment described above, four circumferential main grooves 10 are formed, the number of circumferential main grooves 10 may be other than four. That is, while five ribs 20 defined by the corresponding circumferential main grooves 10 are formed, the number of ribs 20 may be other than five. Regardless of the number of circumferential main grooves 10 and ribs 20, uneven wear resistance can be improved by dividing each rib 20 into a plurality of block portions 25 using the circumferential sipe 30, the circumferential sipe 35, the first narrow shallow groove 40, and the second narrow shallow groove 45, and by defining the corner 26 of each of the block portions 25 using the first narrow shallow groove 40 and the second narrow shallow groove 45. Alternatively, regardless of the number of circumferential main grooves 10 and ribs 20, uneven wear resistance can be improved by dividing each rib 20 into a plurality of block portions 25 using the circumferential sipe 30, the circumferential sipe 35, the first narrow shallow groove 40, and the second narrow shallow groove 45, and by displacing the corners 26 of the respective plurality of block portions 25 from each other in the tire circumferential direction.

EXAMPLES

FIGS. 11A to 11C are each a table showing results of first performance tests of pneumatic tires 1. FIGS. 12A to 12D are each a table showing results of second performance tests of pneumatic tires. In relation to the pneumatic tire 1 described above, there will be described below first and second performance evaluation tests performed on pneumatic tires of a conventional example, the pneumatic tires 1 according to embodiments of the present technology, and pneumatic tires of a comparative example to be compared to the pneumatic tires 1 according to embodiments of the present technology. The first and second performance evaluation tests were tested for uneven wear performance of uneven wear properties of the tread surface 3.

The first and second performance evaluation tests were performed as follows: a pneumatic tire 1 having a nominal size of 295/75R22.5 as defined by JATMA was mounted on a rim wheel of a specified rim defined by JATMA; air pressure was adjusted to the maximum air pressure defined by JATMA; and the pneumatic tire 1 was mounted on a 2-DD test vehicle (tractor head) and test running was performed. In a method for evaluating the uneven wear performance, an incidence of uneven wear of the tread surface 3 was measured after 50000 km traveling in the test vehicle, and the measured incidence of uneven wear is expressed as an index value with Conventional Example 1 described below being assigned the value of 100 in the first evaluation tests, and is expressed as an index value with Conventional Example 2 described below being assigned the value of 100 in the second evaluation test. Larger values indicate less incidence of uneven wear and superior uneven wear resistance.

The first evaluation test was performed on 21 types of pneumatic tires including Conventional Example 1 that was an example of a conventional pneumatic tire 1, Examples 1-1 to 1-19 that were each the pneumatic tire 1 according to the embodiment of the present technology, and Comparative Example 1 that was a pneumatic tire to be compared to the pneumatic tire 1 according to the embodiment of the present technology. The pneumatic tire of Conventional Example 1 of the pneumatic tires 1 has the circumferential sipes 30 and the rib edge sipes 35, but does not have the first narrow shallow grooves 40 and the second narrow shallow grooves 45. The pneumatic tire of Comparative Example 1 has the circumferential sipes 30, the circumferential sipes 35, and the first narrow shallow grooves 40, but does not have the second narrow shallow grooves 45.

In contrast, Examples 1-1 to 1-19, which are each an example of the pneumatic tire 1 according to the embodiment of the present technology, each have all of the circumferential sipes 30, the circumferential sipes 35, the first narrow shallow grooves 40, and the second narrow shallow grooves 45. The pneumatic tires 1 according to Examples 1-1 to 1-19 are each different in: the maximum groove depth $D_{N1}$ of the first narrow shallow groove 40; the maximum groove depth $D_{N2}$ of the second narrow shallow groove 45; the maximum depth $D_{SC}$ of the circumferential sipe 30 with respect to the maximum groove depth D of the circumferential main groove 10; the maximum depth $D_{SE}$ of the leg cuff 35 with respect to the maximum groove depth D of the circumferential main groove 10; whether the angle α of the second narrow shallow groove 45 is an acute angle; whether the angle β of the rib edge sipe 35 is an acute angle; and the length $L_{N1}$ in the tire circumferential direction of the first narrow shallow groove 40 with respect to the length $L_{SC}$ of the circumferential sipe 30 in the tire circumferential direction.

As can be seen from FIGS. 11A to 11C showing the results of performing the first evaluation tests using these pneumatic tires 1, the pneumatic tires 1 of Examples 1-1 to 1-19 each have improved uneven wear resistance compared to Conventional Example 1 and Comparative Example 1. That is, the pneumatic tires 1 according to Examples 1-1 to 1-19 each can provide improved uneven wear resistance to extend wear life.

The second evaluation test was performed on 25 types of pneumatic tires including Conventional Example 2 that was an example of a conventional pneumatic tire 1, Examples 2-1 to 2-23 that were each the pneumatic tire 1 according to the embodiment of the present technology, and Comparative Example 2 that was a pneumatic tire to be compared to the pneumatic tire 1 according to the embodiment of the present technology. The pneumatic tire of Conventional Example 2 of the pneumatic tires 1 has the circumferential sipes 30 and the rib edge sipes 35, but does not have the first narrow shallow grooves 40 and the second narrow shallow grooves 45. The pneumatic tire of Comparative Example 2 has the circumferential sipes 30, the circumferential sipes 35, and the first narrow shallow grooves 40, but does not have the second narrow shallow grooves 45.

In contrast, Examples 2-1 to 2-23, which are each an example of the pneumatic tire 1 according to the embodiment of the present technology, each have all of the circumferential sipes 30, the circumferential sipes 35, the first narrow shallow grooves 40, and the second narrow shallow grooves 45. The pneumatic tires 1 according to Examples 2-1 to 2-23 are each different in: the offset amount $L_{N2}$ between the second narrow shallow grooves 45 in the tire circumferential direction with respect to the distance $L_{SE}$ between the rib edge sipes 35 in the tire circumferential direction; the offset amount $L_{N2}$ between the second narrow shallow grooves 45 in the tire circumferential direction with respect to the length $L_{SC}$ of the circumferential sipe 30 in the tire circumferential direction; the maximum groove depth $D_{N1}$ of the first narrow shallow groove 40; the maximum groove depth $D_{N2}$ of the second narrow shallow groove 45; the maximum depth $D_{SC}$ of the circumferential sipe 30 with respect to the maximum groove depth D of the circumferential main groove 10; the maximum depth $D_{SE}$ of the rib edge sipe 35 with respect to the maximum groove depth D of the circumferential main groove 10; whether the angle α of the second narrow shallow groove 45 is an acute angle; and whether the angle β of the rib edge sipe 35 is an acute angle.

As can be seen from FIGS. 12A to 12D showing the results of performing the second evaluation tests using these pneumatic tires 1, the pneumatic tires 1 of Examples 2-1 to 2-23 each have improved uneven wear resistance compared to Conventional Example 2 and Comparative Example 2. That is, the pneumatic tires 1 according to Examples 2-1 to 2-23 each can provide improved uneven wear resistance to extend wear life.

The invention claimed is:

1. A pneumatic tire comprising:
a plurality of circumferential main grooves extending in a tire circumferential direction;
a rib including at least one end in a tire lateral direction defined by the circumferential main grooves;
a plurality of circumferential sipes extending in the tire circumferential direction, formed in the rib at intervals in the tire circumferential direction;
a plurality of rib edge sipes formed in the rib aligning in the tire circumferential direction, each of the rib edge sipes including a terminating end portion terminating in the rib, and an opening end portion opening to one of the circumferential main grooves;
a plurality of first narrow shallow grooves extending in the tire circumferential direction, each of the first narrow shallow grooves having a groove depth shallower than depths of the circumferential sipes and the rib edge sipes, and including ends each connected to one of the circumferential sipes adjacent to each other in the tire circumferential direction; and
a plurality of second narrow shallow grooves each formed at a groove depth shallower than the depths of the circumferential sipes and the rib edge sipes, each of the second narrow shallow grooves including an inner connection portion that is an end portion connected to one of the first narrow shallow grooves, and including an outer connection portion that is an end portion connected to one of the rib edge sipes,
the first narrow shallow grooves and the second narrow shallow grooves having widths greater than widths of the circumferential sipes and the rib edge sipes.

2. The pneumatic tire according to claim 1, wherein the first narrow shallow grooves have a maximum groove depth $D_{N1}$ in a range 0.5 mm$\leq D_{N1}\leq$4.0 mm.

3. The pneumatic tire according to claim 1, wherein the second narrow shallow grooves have a maximum groove depth $D_{N2}$ in a range 0.5 mm$\leq D_{N2}\leq$4.0 mm.

4. The pneumatic tire according to claim 1, wherein the circumferential sipes have a relationship between a maximum depth $D_{SC}$ of the circumferential sipes and a maximum groove depth D of the circumferential main grooves, being in a range 0.50$\leq(D_{SC}/D)\leq$0.80.

5. The pneumatic tire according to claim 1, wherein the rib edge sipes have a relationship between a maximum depth $D_{SE}$ of the rib edge sipes and a maximum groove depth D of the circumferential main grooves, being in a range 0.60$\leq(D_{SE}/D)\leq$0.90.

6. The pneumatic tire according to claim 1, wherein the second narrow shallow grooves are each inclined in the tire lateral direction from a front side in a tire rotation direction toward a rear side in the tire rotation direction, from an inner connection portion side toward an outer connection portion side.

7. The pneumatic tire according to claim 1, wherein the rib edge sipes are each inclined in the tire lateral direction from a front side in a tire rotation direction toward a rear side in the tire rotation direction, from the terminating end portion side toward an opening end portion side.

8. The pneumatic tire according to claim 1, wherein the circumferential sipes and the first narrow shallow grooves have a relationship between a length $L_{SC}$ of the circumferential sipes in the tire circumferential direction and a length $L_{N1}$ of the first narrow shallow grooves in the tire circumferential direction, being in a range 0.45$\leq(L_{N1}/L_{SC})\leq$0.8.

9. A pneumatic tire comprising:
a plurality of circumferential main grooves extending in a tire circumferential direction;
a rib including at least one end in a tire lateral direction defined by the circumferential main grooves;
a plurality of circumferential sipes extending in the tire circumferential direction, formed in the rib at intervals in the tire circumferential direction;
a plurality of rib edge sipes formed in the rib aligning in the tire circumferential direction, each of the rib edge sipes including a terminating end portion terminating in the rib, and an opening end portion opening to one of the circumferential main grooves;
a plurality of first narrow shallow grooves extending in the tire circumferential direction, each of the first narrow shallow grooves having a groove depth shallower than depths of the circumferential sipes and the rib edge sipes, and including ends each connected to one of the circumferential sipes adjacent to each other in the tire circumferential direction; and
a plurality of second narrow shallow grooves each formed at a groove depth shallower than the depths of the circumferential sipes and the rib edge sipes, each including an inner connection portion that is an end portion connected to one of the first narrow shallow grooves or one of the circumferential sipes, and including an outer connection portion that is an end portion connected to one of the rib edge sipes, the plurality of second narrow shallow grooves being disposed on respective sides across each of the first narrow shallow grooves or each of the circumferential sipes, in the tire lateral direction,
the plurality of second narrow shallow grooves disposed on respective sides across each of the first narrow shallow grooves or the circumferential sipes in the tire lateral direction including the inner connection portions displaced from each other in the tire circumferential direction, and
the first narrow shallow grooves and the second narrow shallow grooves having widths greater than widths of the circumferential sipes and the rib edge sipes.

10. The pneumatic tire according to claim 9, wherein the plurality of second narrow shallow grooves have a relationship between an offset amount $L_{N2}$ between the inner connection portions and a distance $L_{SE}$ in the tire circumferential direction between the opening end portions of the rib edge sipes adjacent to each other in the tire circumferential direction, being in a range 0.5$\leq(L_{N2}/L_{SE})\leq$2.0.

11. The pneumatic tire according to claim 9, wherein the plurality of second narrow shallow grooves have a relationship between an offset amount $L_{N2}$ between the inner connection portions and a length $L_{SC}$ of the circumferential sipes in the tire circumferential direction, being in a range 0.1$\leq(L_{N2}/L_{SC})\leq$0.6.

12. The pneumatic tire according to claim 9, wherein
the rib is formed with a plurality of block portions each including:
one end in the tire lateral direction defined by the one of the circumferential sipes and one of the first narrow shallow grooves;
an other end in the tire lateral direction defined by one of the circumferential main grooves; and
both sides in the tire circumferential direction defined by one of the rib edge sipes and one of the second narrow shallow grooves, respectively, and
the plurality of the second narrow shallow grooves have a relationship between an offset amount $L_{N2}$ between the inner connection portions and a length $L_B$ of the block portions in the tire circumferential direction, being in a range $0.1 \leq (L_{N2}/L_B) \leq 0.4$.

13. The pneumatic tire according to claim 9, wherein the first narrow shallow grooves have a maximum groove depth $D_{N1}$ in a range $0.5 \text{ mm} \leq D_{N1} \leq 4.0 \text{ mm}$.

14. The pneumatic tire according to claim 9, wherein the second narrow shallow grooves have a maximum groove depth $D_{N2}$ in a range $0.5 \text{ mm} \leq D_{N2} \leq 4.0 \text{ mm}$.

15. The pneumatic tire according to claim 9, wherein the circumferential sipes have a relationship between a maximum depth $D_{SC}$ of the circumferential sipes and a maximum groove depth D of the circumferential main grooves, being in a range $0.50 \leq (D_{SC}/D) \leq 0.80$.

16. The pneumatic tire according to claim 9, wherein the rib edge sipes have a relationship between a maximum depth $D_{SE}$ of the rib edge sipes and a maximum groove depth D of the circumferential main grooves, being in a range $0.60 \leq (D_{SE}/D) \leq 0.90$.

17. The pneumatic tire according to claim 9, wherein the second narrow shallow grooves are each inclined in the tire lateral direction from a front side in a tire rotation direction toward a rear side in the tire rotation direction, from an inner connection portion side toward an outer connection portion side.

18. The pneumatic tire according to claim 9, wherein the rib edge sipes are each inclined in the tire lateral direction from a front side in a tire rotation direction toward a rear side in the tire rotation direction, from the terminating end portion side toward an opening end portion side.

19. The pneumatic tire according to claim 9, wherein the circumferential sipes and the first narrow shallow grooves have a relationship between a length $L_{SC}$ of the circumferential sipes in the tire circumferential direction and a length $L_{N1}$ of the first narrow shallow grooves in the tire circumferential direction, being in a range $0.45 \leq (L_{N1}/L_{SC}) \leq 0.8$.

* * * * *